United States Patent [19]

Miyahara

[11] Patent Number: 5,314,850

[45] Date of Patent: * May 24, 1994

[54] ALUMINUM NITRIDE SINTERED BODY AND PRODUCTION THEREOF

[75] Inventor: Kenichiro Miyahara, Kokubu, Japan

[73] Assignee: Kyocera Corporation, Kyoto, Japan

[*] Notice: The portion of the term of this patent subsequent to Dec. 31, 2008 has been disclaimed.

[21] Appl. No.: 222,381

[22] Filed: Jul. 19, 1988

Related U.S. Application Data

[63] Continuation of Ser. No. 924,916, Oct. 29, 1986, abandoned.

[30] Foreign Application Priority Data

| | | | |
|---|---|---|---|
| Oct. 31, 1985 | [JP] | Japan | 60-244647 |
| Nov. 25, 1985 | [JP] | Japan | 60-265692 |
| Jan. 31, 1986 | [JP] | Japan | 61-020721 |
| Apr. 18, 1986 | [JP] | Japan | 61-088265 |
| Aug. 26, 1986 | [JP] | Japan | 61-200803 |

[51] Int. Cl.$^5$ .............................................. C04B 35/58
[52] U.S. Cl. ..................................... 501/96; 501/98; 501/153; 264/65
[58] Field of Search ................... 501/96, 98, 153; 264/65

[56] References Cited

U.S. PATENT DOCUMENTS

| | | | |
|---|---|---|---|
| 4,478,785 | 10/1984 | Huseby et al. | 264/65 |
| 4,578,232 | 3/1986 | Huseby et al. | 501/96 X |
| 4,578,233 | 3/1986 | Huseby et al. | 264/65 |
| 4,578,234 | 3/1986 | Huseby | 264/65 |
| 4,578,364 | 3/1986 | Huseby et al. | 501/98 |
| 4,578,365 | 3/1986 | Huseby et al. | 501/98 |
| 4,591,537 | 3/1986 | Aldinger et al. | 428/698 |
| 4,627,815 | 12/1986 | Aldinger et al. | 501/98 X |
| 4,650,777 | 3/1987 | Kurokaua et al. | 501/96 |
| 4,659,611 | 4/1987 | Iwase et al. | 428/209 |
| 4,672,046 | 6/1987 | Sawamura et al. | 501/98 |
| 4,711,861 | 12/1987 | Sawamura et al. | 501/98 |
| 4,719,187 | 1/1988 | Bardhan et al. | 501/97 |
| 5,077,245 | 12/1991 | Miyahara | 501/96 |
| 5,154,863 | 10/1992 | Miyahara | 561/96 |

FOREIGN PATENT DOCUMENTS

| | | | |
|---|---|---|---|
| 152545 | 8/1985 | European Pat. Off. | 501/98 |
| 3337630 | 4/1985 | Fed. Rep. of Germany | 501/98 |

(List continued on next page.)

OTHER PUBLICATIONS

Shinozaki, K. et al., "Sintering of AlN with Additives Containing IIa Elements," Preprint for Annual Meeting of the Yogyo-Kyokai, pp. 179-180 (May 1984).
Shinozaki, K. et al., "ALN Ceramics with High Thermal Conductivity; 3. Effects of Additives on Thermal (List continued on next page.)

Primary Examiner—Mark L. Bell
Assistant Examiner—C. M. Bonner
Attorney, Agent, or Firm—Spensley Horn Jubas & Lubitz

[57] ABSTRACT

An aluminum nitride sintered body having a thermal conductivity of at least 100 W/mK, preferably at least 120 W/mK, more preferably at least 140 W/mK, and most preferably at least 160 W/mK is produced by baking with a sintering additive using an aluminum nitride starting powder of high purity derived by direct nitriding of metallic aluminum. The sintering additive is selected from compounds of Group IIa, IIIa, and IIIb metals of the periodic table and preferably it comprises predominantly $Y_2O_3$ or a precursor thereof. In one embodiment, the starting powder and the sintering additive are slurried with a binder and an organic solvent and shaped into a sheet. The sheet, after drying and binder removal, is suitable for use in making multilayered ceramic substrates, ceramic heaters, radiators, and the like.

48 Claims, 3 Drawing Sheets

U.S. PATENT DOCUMENTS

| | | | |
|---|---|---|---|
| 59-50077 | 3/1984 | Japan | 501/96 |
| 59-199570 | 11/1984 | Japan | 501/96 |
| 59-207882 | 11/1984 | Japan | 501/96 |
| 59-207883 | 11/1984 | Japan | 501/96 |
| 60-65768 | 4/1985 | Japan | 501/98 |
| 60-71575 | 4/1985 | Japan | 501/98 |
| 60-127208 | 7/1985 | Japan . | |
| 60-151281 | 8/1985 | Japan | 501/98 |
| 60-171270 | 9/1985 | Japan | 501/98 |
| 896766 | 5/1962 | United Kingdom | 423/412 |
| 2127709 | 4/1984 | United Kingdom . | |

OTHER PUBLICATIONS

Conductivity," Preprint for Annual Meeting of the Yogyo-Kyokai, pp. 517–518 (May 1985) Nikkei New Materials, pp. 32–46 (Dec. 23, 1985).

Komeya, K. et al., "Influence of Fibrous Aluminum Nitride on the Strength of Sintered AlN-Y2O3," Trans. J. Brit. Ceram. Soc. vol. 70: 107–113 (1971).

Sakai, T. et al., "Effects of the Oxygen Impurity on the Sintering and the Thermal Conductivity of AlN Polycrystal," Yogyo-Kyokai-Shi vol. 86 (4): 174–179 (1978).

( × 10000 )

( × 10000 )

ALUMINUM NITRIDE SINTERED BODY AND PRODUCTION THEREOF

This is a continuation of application Ser. No. 06,924,916 filed on Oct. 29, 1986, now abandoned.

BACKGROUND OF THE INVENTION

1. Field of the Invention

The present invention relates to an aluminum nitride sintered body, and more particularly to an aluminum nitride sintered body having high thermal conductivity which is produced from a starting powder prepared by direct nitriding of metallic aluminum, and a method of producing the same. The present invention also concerns an aluminum nitride green sheet produced from such a starting powder and a method for making it.

2. Prior Art

With the progress of large-scale integration in recent years, there is an increasing demand for insulated substrates having high thermal conductivity in order to package semiconductor elements generating large amounts of heat such as high integrated circuits, power transistors, laser diodes, and the like.

Sintered bodies based on beryllium oxide or beryllia (BeO) have conventionally been used as ceramic materials having high thermal conductivity, but the use of these materials in a wide variety of applications is limited due to their toxicity. As a substitute for beryllia, aluminum nitride (AlN) has been used in the production of highly thermal conductive substrates because it is stable and has high thermal conductivity in addition to good high-temperature strength and electric insulating properties.

As mentioned above, aluminum nitride possesses properties which make it suitable for use in the production of semiconductor substrates, and its theoretical thermal conductivity is estimated to be as high as about 300 W/mK. However, sintered bodies of aluminum nitride presently available on the market have generally much lower values of thermal conductivity on the order of 100 W/mK or less. Accordingly, improvement in thermal conductivity of aluminum nitride sintered bodies is still desired.

In one method of producing ceramic substrates in which a printing technique is used to form a desired conductive pattern such as a thick-film integrated circuit on the substrate, the conductive pattern is initially formed by means of screen printing on a green ceramic sheet, the printed green sheet is then punched to make blanks, and the blanks are piled one atop another, and are baked to form a ceramic IC package. This method can be performed inexpensively and is suitable for the mass-production of ceramic packages, particularly multilayered ceramic substrates or packages. In order to make aluminum nitride multilayered substrates using this method, it is desired to provide quality green sheets of aluminum nitride which have improved green strength and capable of producing high-quality sintered bodies, and a method of making such green sheets. Production of aluminum nitride green sheets from a starting powder prepared by the alumina reduction method mentioned below is disclosed in Japanese Patent Laid-Open Applications Nos. 60-171270 and 60-180964.

Since it is difficult to sinter aluminum nitride powder alone, it is conventionally sintered with the aid of a sintering additive, which is mixed with an aluminum nitride starting powder prior to shaping. Sintering additives which are known to be suitable for this purpose include compounds of Group IIa metals (alkaline earth metals), Group IIIa metals (rare earth metals), and Group IIIb metals (aluminum group metals) of the periodic table such as $Y_2O_3$ (yttrium oxide or yttria), CaO (lime or calcium oxide), and $CaC_2$ (calcium carbide). See Japanese Patent Laid-Open Applications Nos. 59-207814, 60-60910, 60-65768, 60-71575, etc.

There are two well-known methods for preparing aluminum nitride powder. One is the direct nitriding method in which metallic aluminum powder is directly nitrided with nitrogen or ammonia gas. The other is the alumina reduction method in which alumina powder is mixed with carbon and baked in nitrogen or ammonia gas to effect reduction of alumina and nitriding simultaneously.

In the direct nitriding method, the aluminum nitride powder product is usually contaminated with cationic impurities in an amount of at least a few percent by weight which enter the product from the grinding vessel or grinding media in the step of grinding the starting metallic aluminum material in order to increase the efficiency of nitriding or in the step of pulverizing the aluminum nitride powder formed by nitriding in order to reduce the particle size to one suitable for use in shaping and sintering. The pulverization of formed aluminum nitride powder is usually required since a considerable portion of the powder is agglomerated after nitriding. Also in the pulverization of the aluminum nitride powder, the surface of the powder is oxidized to a certain degree, and therefore the aluminum nitride powder product obtained by the direct nitriding method usually contains oxygen in an amount of at least 2% by weight, and in most cases at least 3% by weight. Such aluminum nitride powder containing oxygen and cationic impurities in such relatively large amounts are not suitable for use as starting materials to produce high-quality aluminum nitride sintered bodies. For this reason, the use of aluminum nitride powder obtained by the direct nitriding method in the production of sintered bodies having high thermal conductivity with the aid of a sintering additive is limited.

In the alumina reduction method, since agglomeration of particles does not occur significantly during nitriding, the starting alumina can be previously pulverized to the desired particle size prior to reduction an nitriding, and the resulting aluminum nitride powder can be used without further pulverization. Thus, according to this method, aluminum nitride powder having an average particle diameter of 2 μm or less can be obtained and it can be directly used as a starting powder in the production of sintered bodies. Because of elimination of the pulverzation procedure after nitriding, aluminum nitride powder prepared by the alumina reduction method is relatively pure. Its content of cationic impurities can be readily decreased to 0.5% by weight or less, and its oxygen content is usually at most 3% by weight. In view of these advantages, in the prior art production of aluminum nitride sintered bodies, aluminum nitride powder obtained by the alumina reduction method has been used in most cases as a starting powder to be sintered with the aid of a sintering additive.

However, as mentioned above, most of the aluminum nitride sintered bodies obtained in the prior art from the above-mentioned relatively pure starting powder prepared by the alumina reduction method exhibit relatively low values of thermal conductivity on the order of 100 W/mK or lower, which is much lower than the theoretical value of about 300 W/mK.

Japanese Patent Laid-Open Applications Nos. 60-178688 and 61-91068 describe the production of aluminum nitride sintered bodies having a thermal conductivity of more than 100 W/mK, but neither of these teach the use of an aluminum nitride starting powder prepared by the direct nitriding method. In addition, in the method described in Japanese Patent Laid-Open Application No. 61-91068, a mixture of an aluminum nitride starting powder and a sintering additive is baked in the presence of free carbon or a carbonaceous substance as a deoxidizer in order to lower the oxygen content of the sintered product and thereby improve its thermal conductivity. This makes the overall operation very complicated.

With respect to the manufacturing process, the direct nitriding method can be performed by a very simple process of heating metallic aluminum powder in nitrogen or ammonia gas followed by pulverization. On the contrary, the alumina reduction method involves (1) thorough mixing of alumina powder and carbon powder, (2) heating of the mixed powder in nitrogen or ammonia gas, and (3) removal of the residual carbon by oxidation or burning. Because of its simplicity, the direct nitriding method can provide aluminum nitride powder at much lower cost than the alumina reduction method. Typically, the cost of manufacturing aluminum nitride powder by the direct nitriding method is from one-fourth to one-sixth of that by the alumina reduction method.

Accordingly, it is very advantageous to use an aluminum nitride starting powder prepared by the direct nitriding method in the production of aluminum nitride sintered bodies in order to decrease the manufacturing cost thereof. However, as mentioned above, the use of aluminum nitride powder prepared by the direct nitriding method has been limited, particularly in the production of sintered bodies having high thermal conductivity, due to its relatively low purity.

SUMMARY OF THE INVENTION

It is an object of the present invention to provide an inexpensive aluminum nitride sintered body having high thermal conductivity produced from a starting powder prepared by the direct nitriding method.

It is another object of the present invention to provide a highly dense, high-strength aluminum nitride sintered body having a thermal conductivity of at least 100 W/mK, preferably at least 120 W/mK, more preferably at least 140 W/mK, and most preferably at least 160 W/mK.

A further object of the present invention is to provide a process for the production of a highly thermally conductive and highly dense aluminum nitride sintered body from an aluminum nitride starting powder prepared by the direct nitriding method.

A still further object of the present invention is to provide a green sheet of aluminum nitride having high green strength and capable of producing a highly thermally conductive and highly dense sintered sheet of aluminum nitride, and a method of making such a green sheet.

Other objects as well as apparent to those skilled in the art from the following description and examples.

As described above, aside from impurities present in the starting metallic aluminum, contamination of aluminum nitride powder prepared by the direct nitriding method mainly arises from abrasion of the grinding vessel or media during pulverization of the nitrided powder, and these impurities or contaminants are significant causes for deterioration in thermal conductivity of sintered bodies. The present inventor has attempted to eliminate or reduce such contamination in order to obtain aluminum nitride powder of high purity by the direct nitriding method, and found that one can prepare highly pure aluminum nitride powder by the direct nitriding method if the starting metallic aluminum is of high purity and the pulverization of the nitrided powder is carried out in a non-oxidizing atmosphere or in an organic solvent in order to minimize oxidation on the powder surface and contamination from the grinding vessel or media.

Also it has surprisingly been found that from the highly pure aluminum nitride powder thus obtained by the direct nitriding method, an aluminum nitride sintered body having high thermal conductivity of at least 100 W/mK can be produced by sintering with the aid of a sintering additive such as $Y_2O_3$ which is present in an amount well balanced with the oxygen content in the starting aluminum nitride powder.

In one aspect, the present invention provides an aluminum nitride sintered body produced from an aluminum nitride starting powder which has been derived by the direct nitriding method. The sintered body is produced by baking the starting powder with a sintering additive selected from compounds of Groups IIa, IIIa, and IIIb metals of the periodic table, and the aluminum nitride sintered body product has a thermal conductivity of at least 100 W/mK and a relative density of at least 95%. Preferably, the aluminum nitride sintered body consists of AlN grain phases and yttrium-containing grain boundary phases in which yttrium comprises a major proportion of the metallic content in the grain boundary.

In another aspect, the present invention provides a process for producing an aluminum nitride sintered body having a thermal conductivity of at least 100 W/mK and a relative density of at least 95%, comprising mixing a minor amount of a sintering additive selected from compounds of Group IIa, IIIa, and IIIb metals of the periodic table with an aluminum nitride starting powder prepared by direct nitriding of metallic aluminum and having a purity of at least 99%, an oxygen content of lower than 1.8% by weight and an Si content of not greater than 0.7% by weight to form a powder mixture, shaping the powder mixture, and baking the shaped mixture at a temperature in the range of 1500°-2100° C. in a non-oxidizing atmosphere for a length of time sufficient to sinter the mixture.

DETAILED DESCRIPTION OF THE PREFERRED EMBODIMENTS

Figure 1:
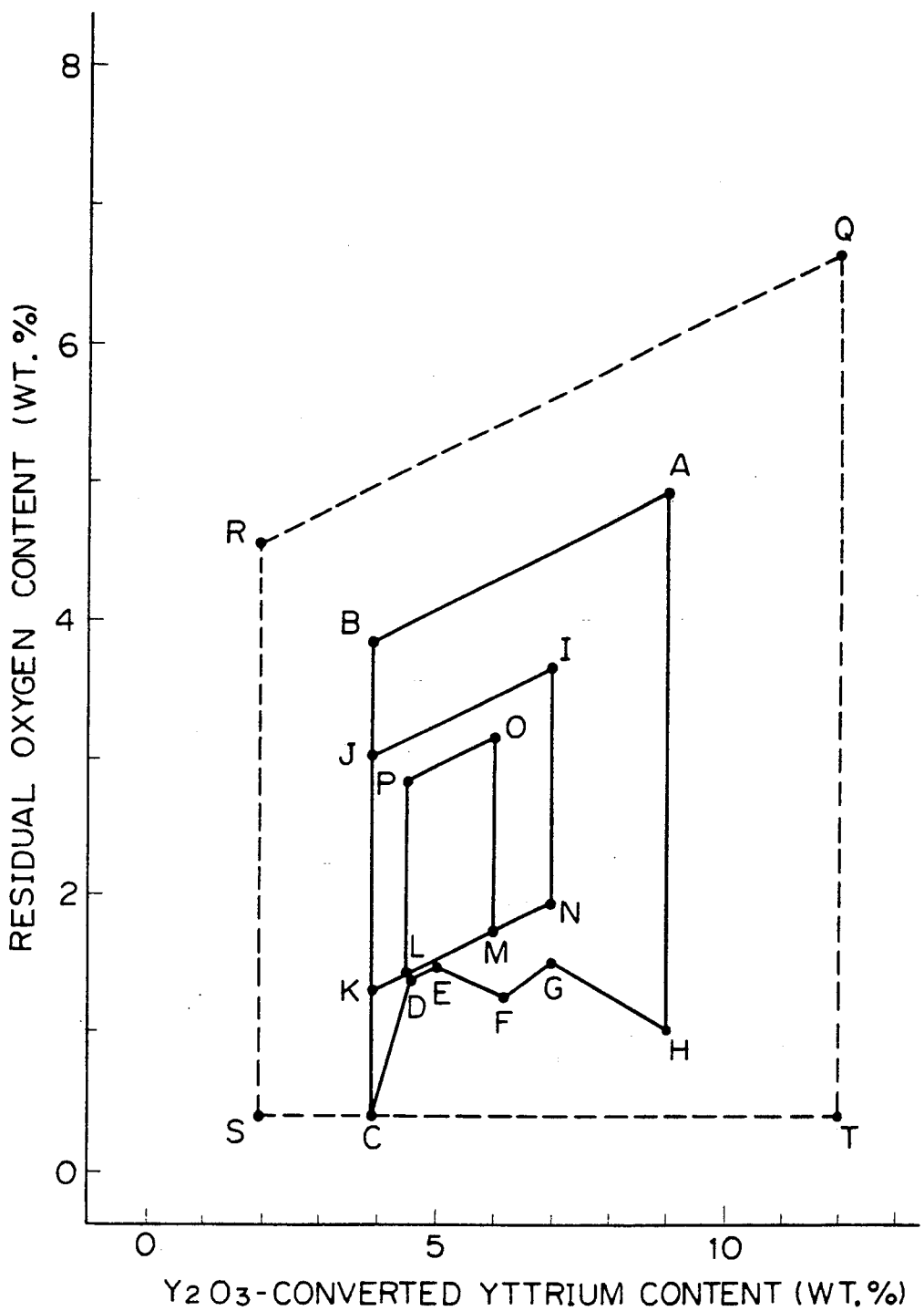
FIG. 1 is a chart showing preferable ranges of the $Y_2O_3$-converted yttrium content and the residual oxygen content (which are defined below) in the aluminum nitride sintered body of the present invention.

The aluminum nitride sintered body according to the present invention is produced from an aluminum nitride starting powder derived by direct nitriding of metallic aluminum by baking the powder with a sintering additive such as an yttrium compound. When the sintering additive comprises an yttrium compound, the sintered body consists of AlN grain phases and yttrium-containing grain boundary phases. The thermal conductivity of the aluminum nitride sintered body of the present invention is at least 100 W/mK, preferably at least 120 W/mK, more preferably at least 140 W/mK, and most preferably at least 160 W/mK, and its relative density is at least 95%, preferably at least 97%, and most preferably at least 98.5%. The sintering additive is selected from the group consisting of compounds of Groups IIa (alkaline earth group), IIIa (rare earth group) and IIIb (aluminum group) metals of the periodic table. When an yttrium compound is used as a sintering additive, it is preferably used in such an amount that the resulting sintered body contains yttrium in a concentration of greater than 2% and lower than 12% by weight, preferably from 3.9% to 9.0%, more preferably from 3.9% to 7.0%, and most preferably from 4.5 to 6.0% calculated as $Y_2O_3$ based on the total weight of the sintered body.

The phase structure of an aluminum nitride sintered body which is produced with the aid of a sintering additive consists of AlN grain phases and grain boundary phases which bind the AlN grain phases together. The exact composition of the crystalline substances present in the grain boundary phases varies depending on various factors including the type of the sintering additive, the purity of the aluminum nitride starting powder, the baking temperature and atmosphere, and the like, and the thermal conductivity of an aluminum nitride sintered body greatly depends on the composition of the grain boundary phases. For example, when $Y_2O_3$ is used as a sintering additive, the following substances can be formed in the grain boundary phases: YAG ($Y_3Al_5O_{12}$), $YAlO_3$, $Y_4Al_2O_9$, $Y_2O_3$, $AlN \cdot Al_2O_3$ spinel, YN, an unknown substance, and 27R-polytype (a kind of SIALON). The present inventor has found that the thermal conductivity of an aluminum nitride sintered body is much improved when $YAlO_3$ or $Y_4Al_2O_9$ or both, preferably $Y_4Al_2O_9$ is present as the primary phase in the grain boundaries, and therefore it is desirable that such crystalline substances be formed in the grain boundary phases. Although the reason for this is not clearly understood, it is thought that when the grain boundaries are composed predominantly of one or both of $YAlO_3$ and $Y_4Al_2O_9$, the outer edges of the grains become more even so as to attain enhanced fit between adjacent grains. In addition, $YAlO_3$ and $Y_4Al_2O_9$ themselves exhibit relatively high thermal conductivity. As a result, heat diffusion through the grain boundaries is promoted leading to increased thermal conductivity. Other crystalline substances, if present in the grain boundary phases in a major proportion, will not greatly contribute to improvement in fit between adjacent grains, and YAG ($Y_3Al_5O_{12}$) and $Y_2O_3$ possess low thermal conductivity of about 12 W/mK and about 27 W/mK, respectively, so that good heat diffusion will not be achieved through the grain boundary phases.

The above-mentioned $YAlO_3$ and $Y_4Al_2O_9$ which are desirably present in the grain boundary phases are formed by the reation of an non-reducing yttrium compound such as $Y_2O_3$ or a precurs or thereof with oxygen and Al-containing impurities which are inevitably present in an aluminum nitride starting material by degradation of AlN.

The present inventor has found that when the total oxygen content and the yttrium content of an aluminum nitride sintered body are determined, the thermal conductivity of the sintered body depends on each of the oxygen and the yttrium contents as well as the balance between these contents. Since yttrium is present in the sintered body most frequently in the form of oxygen-containing compounds, the determined yttrium content is converted into an equivalent amount of $Y_2O_3$ by multiplying the determined yttrium content by 1.27. The amount of $Y_2O_3$ calculated by such multiplication is herein referred to as $Y_2O_3$-converted yttrium content. In order to estimate the content of oxygen which is not combined with yttrium, the amount of oxygen contained in the $Y_2O_3$-converted yttrium content is subtracted from the determined total oxygen content, and the value calculated by such subtraction is taken as the content of oxygen which is not combined with yttrium. Such oxygen content is herein referred to as residual oxygen content, and it can be calculated by the following equation:

$$R.O.C. = \text{Total } O_2 \text{ content} - (Y_2O_3\text{-converted Y content}) \times 0.212$$

where R.O.C. is the residual oxygen content (wt. %). In view of the above explanation it is assumed that the individual values of $Y_2O_3$-converted yttrium content and the residual oxygen content, and the weight ratio of the $Y_2O_3$-converted yttrium content to the residual oxygen content have some correlation with thermal conductivity of the sintered body. In other words, these parameters can be used as indications in order to expect the thermal conductivity of an aluminum nitride sintered body.

On the basis of the above assumption, the present inventor prepared a number of samples of aluminum nitride sintered bodies from starting powders obtained by direct nitriding of metallic aluminum using $Y_2O_3$ as a sintering additive, and studied the effect of the relationship between the $Y_2O_3$-converted yttrium content and the residual oxygen content of the sintered bodies on the thermal conductivity thereof. As a result of this study, it has been found that by proper selection of the weight ratio of the $Y_2O_3$-converted yttrium content to the residual oxygen content and the individual values of these contents, an aluminum nitride sintered body having high thermal conductivity can be produced from a starting material prepared by the direct nitriding method.

FIG. 1 is a chart showing the relationship between the $Y_2O_3$-converted yttrium content of aluminum nitride sintered bodies (as abscissa) and the residual oxygen content thereof (as ordinate) both in weight percent. When the plot of the $Y_2O_3$-converted yttrium content of a sintered body versus the residual oxygen content thereof is located within the region defined by lines Q-R-S-T-Q in FIG. 1 (excluding the cases where the plot is on one of the lines), the sintered body will have a thermal conductivity of at least 100 W/mK.

In a preferred embodiment of the present invention, the plot of the $Y_2O_3$-converted yttrium content versus the residual oxygen content is located within the region defined by lines A-B-C-D-E-F-G-H-A in FIG. 1 (excluding point C but including the cases where the plot is on one of the lines). In this case, the sintered body will have a thermal conductivity of at least 120 W/mK. When the plot of the $Y_2O_3$-converted yttrium content versus the residual oxygen content is located within the region defined by lines I-J-K-N-I in FIG. 1 (including the cases where the plot is on one of the lines), the sintered body will have a thermal conductivity of at least 140 W/mK. In a particularly preferred embodiment, the plot of the $Y_2O_3$-converted yttrium content versus the residual oxygen content is located within the region defined by lines O-P-L-M-O in FIG. 1 (including the cases where the plot is on one of the lines). In this case, the sintered body will have a very high thermal conductivity of at least 160 W/mK. In FIG. 1, the dotted lines indicate that the lines are not included in the region, while the solid lines indicate that the lines are included in the region.

In FIG. 1, the values of the abscissa ($Y_2O_3$-converted yttrium content in weight percent) and the ordinate (residual oxygen content in weight percent) at each of points A-T are as follows:

| Point | Abscissa | Ordinate | Point | Abscissa | Ordinate |
| --- | --- | --- | --- | --- | --- |
| A | 9.0 | 4.92 | K | 3.9 | 1.28 |
| B | 3.9 | 3.83 | L | 4.5 | 1.41 |
| C | 3.9 | 0.38 | M | 6.0 | 1.72 |
| D | 4.6 | 1.39 | N | 7.0 | 1.92 |
| E | 5.0 | 1.48 | O | 6.0 | 3.15 |
| F | 6.2 | 1.25 | P | 4.5 | 2.85 |
| G | 7.0 | 1.50 | Q | 12.0 | 6.69 |
| H | 9.0 | 1.02 | R | 2.0 | 4.56 |
| I | 7.0 | 3.67 | S | 2.0 | 0.38 |
| J | 3.9 | 3.01 | T | 12.0 | 0.38 |

In a preferred embodiment of the present invention, there is a provided an aluminum nitride sintered body having improved bending strength in addition to improved thermal conductivity. Such a sintered body with high bending strength can be obtained when the weight ratio of the $Al_2O_3$-converted residual oxygen content (the residual oxygen content expressed in weight percent as $Al_2O_3$ and can be calculated by multiplying the residual oxygen content by 2.124) to the $Y_2O_3$-converted yttrium content $[Al_2O_3/Y_2O_3]$ in the sintered body, and the individual values of $Al_2O_3$-converted residual oxygen content $[Al_2O_3]$ and $Y_2O_3$-converted yttrium content $[Y_2O_3]$ therein fall within certain ranges. Specifically, a sintered body having a thermal conductivity of at least 100 W/mK and a three-point bending strength of at least 30 kg/mm² can be obtained when the weight ratio of the $Al_2O_3$-converted residual oxygen content to the $Y_2O_3$-converted yttrium content $[Al_2O_3/Y_2O_3]$ in the sintered body, and the individual values of $Al_2O_3$-converted residual oxygen content $[Al_2O_3]$ and $Y_2O_3$-converted yttrium content $[Y_2O_3]$ therein meet the following requirements:

$0.2 \leq [Al_2O_3/Y_2O_3] \leq 2.4$, $1.1 \leq [Al_2O_3] \leq 12.0$ (in weight percent), and $2.0 < [Y_2O_3] < 12.0$ (in weight percent)

Preferably, the weight ratio $[Al_2O_3/Y_2O_3]$, and the values of $[Al_2O_3]$ and $[Y_2O_3]$ meet the following requirements:

$0.2 \leq [Al_2O_3/Y_2O_3] \leq 1.7$, $1.1 \leq [Al_2O_3] \leq 11.0$ (in weight percent), and $3.9 \leq [Y_2O_3] \leq 9.0$ (in weight percent), and in this case the sintered body will have a thermal conductivity of at least 120 W/mK and a three-point bending strength of at least 35 kg/mm².

A more preferable aluminum nitride sintered body according to the present invention has a weight ratio $[Al_2O_3/Y_2O_3]$, and values of $[Al_2O_3]$ and $[Y_2O_3]$ which meet the following requirements:

$0.6 \leq [Al_2O_3/Y_2O_3] \leq 1.4$, $3.2 \leq [Al_2O_3] \leq 7.0$ (in weight percent), and $3.9 \leq [Y_2O_3] \leq 7.0$ (in weight percent).

Such a sintered body will exhibit a thermal conductivity of at least 140 W/mK and a three-point bending strength of at least 40 kg/mm².

Most preferably the sintered body has a weight ratio $[Al_2O_3/Y_2O_3]$, and values of $[Al_2O_3]$ and $[Y_2O_3]$ which meet the following requirements:

$0.6 \leq [Al_2O_3/Y_2O_3] \leq 1.2$, $3.2 \leq [Al_2O_3] \leq 6.0$ (in weight percent), and $4.5 \leq [Y_2O_3] \leq 6.0$ (in weight percent).

Such a sintered body will exhibit a thermal conductivity of at least 160 W/mK and a three-point bending strength of at least 40 kg/mm².

As mentioned previously, when a sintering additive comprising predominantly $Y_2O_3$ or a precursor thereof is used, the grain boundary phases in the sintered body will be mainly composed of crystalline substances formed by reaction of a Y-containing component with oxygen and Al-containing component at an elevated temperature during baking. In addition, the grain boundary phases will contain Si (silicon) which inevitably enter the starting powder or powder mixture. If the weight ratio of the Si content to the Y content in the aluminum nitride sintered body is too high, the thermal conductivity of the sintered body tends to deteriorate even if its oxygen content is maintained at a lower level. The reason for this is not clearly understood, but it is thought to be as follows. As described below, Si dissolves in the AlN grains to form a solid solution or reacts with AlN during baking, resulting in deterioration in thermal conductivity, but the presence of yttrium in the powder mixture can suppress such dissolution or reaction of Si. However, if the ratio of Si to Y in the powder mixture is too high, the above-mentioned effect of yttrium can not be attained sufficiently so that it is difficult for the resulting sintered body to exhibit a high thermal conductivity.

In a preferred embodiment of the present invention, the weight ratio of the Si content to the Y content [Si/Y] in the sintered body and the individual values of the Si content [Si] and the Y content [Y] therein fall within the following ranges:

$[Si/Y] \leq 1.32$, $[Si] \leq 1.3$ (in weight percent), and $1.6 < [Y] < 9.4$ (in weight percent),

[the last formula, if rewritten in terms of $Y_2O_3$ content $[Y_2O_3]$, corresponds to $2.0 < [Y_2O_3] < 12.0$ (in weight percent)], and in this case the sintered body is ensured to have a thermal conductivity of at least 100 W/mK.

Preferably, the weight ratio [Si/Y] and the values of [Si] and [Y] satisfy the following relationship:

$[Si/Y] \leq 0.21$, $[Si] \leq 0.9$ (in weight percent), and $3.1 \leq [Y] \leq 7.1$ (in weight percent),

[the last formula corresponds to $3.9 \leq [Y_2O_3] \leq 9.0$ (in weight percent)]. Such a sintered body will have a thermal conductivity of at least 120 W/mK. More preferably, when the sintered body has a weight ratio [Si/Y] and values of [Si] and [Y] which satisfy the following relationship:

$[Si/Y] \leq 0.12$, $[Si] \leq 0.5$ (in weight percent), and $3.1 \leq [Y] \leq 5.5$ (in weight percent),

[the last formula corresponds to $3.9 \leq [Y_2O_3] \leq 7.0$ (in weight percent)], it will exhibit a thermal conductivity of at least 140 W/mK. Most preferably, the sintered body has a weight ratio [Si/Y] and values of [Si] and [Y] which satisfy the following relationship:

$[Si/Y] \leq 0.05$, $[Si] \leq 0.2$ (in weight percent), and $3.5 \leq [Y] \leq 4.7$ (in weight percent),

[the last formula corresponds to $4.5 \leq [Y_2O_3] \leq 6.0$ (in weight percent)]. Such a sintered body will have a thermal conductivity of at least 160 W/mK.

The present inventor has also studied the effect of the composition of the metallic components present in the grain boundary phases of aluminum nitride sintered bodies on the thermal conductivity thereof, and found that a particularly high thermal conductivity can be attained when the grain boundary phases contain yttrium, aluminum, and silicon in concentrations within certain ranges. Specifically, in a preferred aluminum nitride sintered body according to the present invention, the metallic composition of the grain boundary phases in the sintered body comprises 60%-91% by weight of Y, 8%-35% by weight of Al, and not greater than 10% by weight of Si based on the total metallic content in the grain boundary phases (i.e., sum of all the metallic contents of the phases), and such a sintered body will have a thermal conductivity of at least 140 W/mK. Most preferably, an aluminum nitride sintered body having an extremely high thermal conductivity of at least 160 W/mK can be obtained by adjusting the metallic content of the grain boundary phases in the sintered body so as to comprise 70%-91% by weight of Y, 8%-25% by weight of Al, and not greater than 3% by weight of Si based on the total metallic content in the grain boundary phases.

When the Y content of the grain boundary phases is less than 60% by weight based on the total metallic content thereof, the sintered body tends to deteriorate in bending strength in addition to thermal conductivity. If the grain boundary phases comprise less than 8% by weight of Al based on the total metallic content thereof, the sintered body will also deteriorate in bending strength. The presence of more than 35% by weight of Al based on the total metallic content in the grain boundary phases will adversely affect thermal conductivity and bending strength of the sintered body due to the formation of ALON ($AlN \cdot Al_2O_3$ spinel) in the grain boundaries. The presence of more than 10% by weight of Si based on the total metallic content in the grain boundary phases will result in the formation of SIALON and unknown crystallites in the grain boundaries which causes a significant decrease in thermal conductivity.

The aluminum nitride sintered body according to the present invention has a high relative density of at least 95%. The relative density of the sintered body is preferably at least 97%, and more preferably at least 98.5%.

The aluminum nitride sintered body of the present invention is produced from an aluminum nitride starting powder prepared by the direct nitriding method, i.e., nitriding of metallic aluminum powder. The starting powder used should be of high purity on the order of 99% or higher and its oxygen content should be lower than 1.8%.

The oxygen content of an aluminum nitride starting powder is the sum of the content of combined oxygen which is present in the form of oxides or other compounds, plus the content of oxygen present as a solid solution in AlN.

The term "purity" of an aluminum nitride starting powder used herein is the value calculated by subtracting the total content (in weight percent) of cationic impurities from 100 percent. The total content of cationic impurities is actually determined by analysis, for example, by means of ICP (induction coupled plasma) emission spectroscopic analysis or atomic absorption analysis. Thus, at least 99% purity of a starting powder indicates that the total content of cationic impurities is not greater than 1%. Such cationic impurities include Fe, C, Si, Ti, V, Cr, Mn, Ca, Mg, Co, Ni, and the like. It is preferred that these impurities be present in the starting powder within the following ranges by weight:

Fe: 0.001–0.08%,
C: 0.01–0.07%,
Si: 0.001–0.7%, more preferably at most 0.4%, and most preferably at most 0.2%,
Ti, V, Cr, Mn, Ca, Mg: at most 0.01%, respectively, and Co, Ni: at most 0.001%, respectively.

The purity of the starting powder useful in the process of the present invention is preferably at least 99.5%, and more preferably at least 99.7%. If the purity of the starting powder is less than 99%, its Si content will be too high to attain the desired thermal conductivity of at least 100 W/mK in the resulting sintered body.

Of the above-mentioned cationic impurities, Si is expected to dissolve in AlN to form a solid solution or react with AlN to form AlN polytype (SIALON, Al-Si-O-N) during baking. The AlN polytype thus formed is known to facilitate grain growth and tends to form fibrous structures during sintering, resulting in deterioration in the thermal conductivity of the sintered body. Therefore, it is favorable to restrict the Si content of the starting powder to at most 0.7%, preferably at most 0.4%, and more preferably at most 0.2% in order to ensure improvement in the thermal conductivity of the sintered body.

Regarding the oxygen content of the starting powder, if it is not lower than 1.8% by weight, the oxygen content of the resulting sintered body will generally be too high to attain the desired high thermal conductivity therein.

The high purity aluminum nitride starting powder useful in the present invention can be obtained by the direct nitriding method using aluminum powder of high purity (preferably of at least 98.5% purity) as follows. The aluminum powder is heated in ammonia gas or nitrogen to effect nitriding, and the resulting aluminum nitride powder is pulverized either in a non-oxidizing atmosphere such as nitrogen, argon, helium, carbon monoxide, or hydrogen, or in an organic solvent to reduce the particle size to a desired level. Commercially available high purity aluminum nitride powder can be used provided that its purity and oxygen content satisfy the above-mentioned requirements.

The pulverization of aluminum nitride powder is preferably conducted in an organic solvent, since it tends to minimize contamination of the powder with cationic impurities during pulverization. Any organic solvent may be used for this purpose irrespective of whether it is polar or non-polar. Examples of useful solvents include alcohols, ketones, aldehydes, aromatic hydrocarbons, paraffinic hydrocarbons, and the like. Such pulverization may be applied to a powder mixture, i.e., after the aluminum nitride powder is mixed with a sintering additive.

A suitable average particle diameter of the aluminum nitride starting powder is not greater than 5 μm. If the starting powder has an average particle diameter exceeding 5 μm, the resulting sintered body will tend to be deteriorated in all of thermal conductivity, relative density, and bending strength. Preferably the average particle diameter of the starting powder is within the range of from 1 to 3 μm.

According to the process of the present invention, the above-mentioned aluminum nitride starting powder prepared by the direct nitriding method is mixed with an appropriate amount of a powdery sintering additive to form a powder mixture, which is then shaped and baked in the conventional manner. The sintering additive may be selected from the group consisting of compounds of Groups IIa (alkaline earth group), IIIa (rare earth group) and IIIb (aluminum group) metals of the periodic table. Examples of compounds which are useful as a sintering additive in the present invention are oxides, carbides, nitrides, fluorides and borides of the alkaline earth metals, rare earth metals (including yttrium) and aluminum group metals (e.g., $Y_2O_3$, CaO, BeO, $Ho_2O_3$, $YC_2$, $B_4C$, YN, BN, $YF_3$, $CaF_2$, BaF, $HoF_3$, $DyF_3$, $NdF_3$, etc.), as well as intermetallic compounds of Al and Y (e.g., $YAl_3$, YAl, $Y_3Al_2$, $Y_2Al$, $Y_3Al$, etc.). One or more of these compounds may be used in the powder mixture, and precursors of these compounds which decompose at the baking temperature to form the above-mentioned compounds may also be used. Preferably, the sintering additive consists essentially of or comprises predominantly a non-reducing compound of yttrium. More preferably, the sintering additive consists essentially of $Y_2O_3$ or a precursor thereof, or a mixture thereof with a compound selected from the above group, and in the latter case $Y_2O_3$ or its precursor desirably comprises a major proportion of the mixture. As the precursor of $Y_2O_3$, any yttrium compound which decomposes at the baking temperature to form $Y_2O_3$ can be used, and examples of such compound are yttrium carbonate [$Y_2(CO_3)_3$], yttrium acetate [$Y(CH_3COO)_3$], and yttrium oxalate [$Y_2(C_2O_4)_3$].

When the sintering additive consists essentially of or comprises predominantly $Y_2O_3$ or a precursor thereof, it is mixed with the aluminum nitride starting powder in such an amount that the resulting sintered body has a value of the previously-defined $Y_2O_3$-converted yttrium content which fall within the range defined in FIG. 1. Since the Y content in the sintering additive can be considered to be substantially maintained in the sintered body without appreciable loss during baking, the $Y_2O_3$-converted yttrium content of a sintered body is estimated from the Y content of the powder mixture. Thus, the amount of the sintering additive added to the starting powder may be selected so as to provide a powder mixture having a value of $Y_2O_3$-converted yttrium content which fall within the range defined in FIG. 1. Specifically, when $Y_2O_3$ or a precursor thereof is used as a sintering additive, it is added in an amount of from about 2% to about 12% by weight calculated as $Y_2O_3$ based on the total weight of the powder mixture (i.e., from point S to point T in FIG. 1). Preferably the amount of such sintering additive is from 3.9% to 9.0% by weight (from point C to point H), more preferably from 3.9% to 7.0% by weight (from point K to point N), and most preferably from 4.5% to 6.0% by weight (from point L to point M) as $Y_2O_3$ based on the total weight of the powder mixture.

Taking the oxygen content of the aluminum nitride starting powder into consideration, the type and amount of the sintering additive used in the process may also be selected such that the previously-defined "residual oxygen content" of the resulting sintered body falls within the range defined in FIG. 1. It can be assumed that there is no substantial increase in oxygen content during baking, since baking is conducted in a non-oxidizing atmosphere (including vacuum) as described below. Therefore, one can select the type and amount of the sintering additive in such a manner that the balance (i.e., residual oxygen content) calculated by subtracting the amount of oxygen which will combine with the yttrium content in the powder mixture from the total oxygen content of the powder mixture falls within the range defined in FIG. 1. Specifically, the residual oxygen content of the powder mixture is within the range of from 0.38% to 6.69% by weight (from point S to point Q in FIG. 1), preferably from 0.38% to 4.92% by weight (from point C to point A), more preferably from 1.28% to 3.67% by weight (from point K to point I), and most preferably from 1.41% to 3.15% by weight (from point L to point O) based on the total weight of the powder mixture. Assuming that all the residual oxygen content is present as $Al_2O_3$ (i.e., it is converted into an equivalent amount of $Al_2O_3$, or into the $Al_2O_3$-converted residual oxygen content), the above range of the residual oxygen content corresponds to from 0.81% to 14.2% by weight, preferably from 0.81% to 10.5% by weight, more preferably from 2.72% to 7.80%, and most preferably from 3.00 to 6.69% by weight of the $Al_2O_3$-converted residual oxygen content.

As discussed above, in order to ensure that a sintered body having high bending strength is produced, it is favorable that the weight ratio of the $Al_2O_3$-converted residual oxygen content to the $Y_2O_3$-converted yttrium content in the sintered body, and the individual values of the $Al_2O_3$-converted residual oxygen content and the $Y_2O_3$-converted yttrium content therein meet certain requirements. The type and amount of the sintering additive may preferably be selected in such a manner that these requirements are satisfied in the powder mixture, when it is desired to provide a sintered body having high bending strength.

In addition, the amount of Si in the powder mixture may affect the thermal conductivity of the resulting sintered body as discussed above. Therefore, the Si content and the weight ratio of the Si content to the Y content of the powder mixture are preferably selected so as to fall within the range defined above with respect to the sintered body.

It is preferable to use a sintering additive having an average particle diameter in the range of from about 0.5 μm to about 3 μm.

In order to ensure the formation of a sintered body having a thermal conductivity of at least 100 W/mK, it is preferable to use a powder mixture having an average particle diameter of at most 2.5 μm and containing not greater than 1.0% by weight of Si and not greater than about 6% by weight of oxygen.

Mixing of the aluminum nitride starting powder with the sintering additive may be conducted by dry mixing in a non-oxidizing atmosphere or by wet mixing in an organic solvent. Wet mixing using an alcohol, ketone, aromatic hydrocarbon, or similar organic solvent is preferred. If necessary, the powder mixture may be pulverized during the mixing to reduce the particle size to a desired level.

The shaping and baking of the powder mixture may be carried out in a conventional manner. For example, a minor amount of a suitable binder (e.g., one or more of paraffin wax, stearic acid, polyvinylbutyral, ethylcellulose, methyl methacrylate/ethyl acrylate copolymer, and the like) are added to the powder mixture, and shaped into the desired configuration by a conventional technique such as dry pressing, rubber pressing, extrusion, injection molding, or the doctor blade sheet formation process. The shaped green body is then baked in a non-oxidizing atmosphere at subatmospheric, atmospheric, or super-atmospheric pressure. The atmosphere may be an inert gas such as nitrogen, argon or helium, which may contain hydrogen or other reducing gas. The shaping and baking may be conducted simultaneously, for example, by hot pressing.

The baking temperature depends on the particular shaping and sintering technique, and it is generally within the range of 1500°–2100° C. If it is lower than 1500° C., the resulting sintered body will not be densified sufficiently. At a baking temperature exceeding 2100° C., sublimation or decomposition of AlN grains will tend to take place significantly. When the green body is baked by a technique of pressureless sintering, the baking temperature is preferably in the range of from 1750° C. to 1950° C. More preferably the baking temperature in such a case is not higher than 1860° C., and most preferably not higher than 1840° C. Baking by hot pressing is preferably carried out at a temperature of 1600°–1800° C. When the green body is baked under pressure (i.e., at a gas pressure greater than 1 atm.) in gas pressure sintering, the baking temperature is preferably in the range of 1880°–1970° C. Baking by hot isostatic pressing (HIP) is preferably conducted at a temperature in the range of 1500°–2000° C.

In one embodiment of the process of the present invention, the above-mentioned powder mixture is slurried with an organic solvent and shaped into a sheet by the doctor blade process, and the resulting sheet is dried to evaporate the organic solvent leaving a green sheet.

The green sheet is baked as such or after it is processed in a manner conventionally employed in the production of IC packages, yielding a sintered body in the form of sheet. Baking of such a green sheet is preferably carried out at a temperature of 1750°–1950° C. in a non-oxidizing atmosphere by a technique such as pressureless sintering, gas pressure sintering, hot isostatic pressing, or a combination thereof.

The formation of a green sheet as above is useful in making IC ceramic substrates, particularly in making multilayered ceramic substrates or packages. The green sheet may conveniently be formed by the doctor blade process from a slurry prepared by wet mixing the starting powder and the sintering additive in an organic solvent, and a suitable organic polymeric binder, for example, one or more of butyral or acrylate polymers such as polyvinylbutyral, polyisobutyl methacrylate, polybutyl methacrylate, and a copolymer of methyl methacrylate and ethyl acrylate, and optionally a plasticizer (e.g., dibutyl phthalate) are added to the slurry. If desired, the slurry may be subsequently subjected to grinding or milling prior to shaping into a sheet. Alternatively, all the materials (the starting powder, sintering additive, binder and optional plasticizer) may be mixed and milled at once in an organic solvent to form a slurry for use in the doctor blade process. From the green sheet thus formed, multilayered ceramic substrates or packages may be made, for example, by providing through-holes in the sheet, applying on the sheet the desired pattern of a conductor paste such as one comprised predominantly of tungsten, punching the sheet into blanks, piling the blanks one atop another, and after degreasing, baking the piled blanks together in a non-oxidizing atmosphere by a technique of pressureless sintering.

It has been found that in the formation of a green sheet in the manner mentioned above, a particularly high green strength can be attained in the sheet when the aluminum nitride starting powder has a particle size distribution in which from 22% to 45% by volume of the powder is made up of particles having a diameter equal to or larger than 3 μm and from 55% to 78% by volume of the powder is made up of particles having a diameter smaller than 3 μm.

Figure 2:
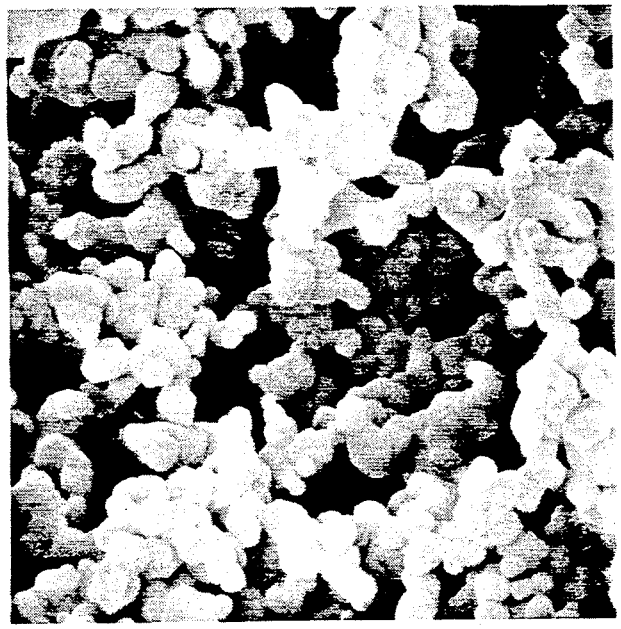
FIG. 2 is an electron micrograph of an aluminum nitride starting powder prepared by the alumina reduction method.

An aluminum nitride powder prepared by the alumina reduction method (reduction of alumina with carbon) is generally comprised of very fine particles, as shown by the electron micrograph in FIG. 2. As is apparent from FIG. 2, the powder generally comprises particles of less than 3 μm in diameter in a proportion of at least 90% by volume, and the shape of particles is relatively uniform or regular and nearly spherical. Such aluminum nitride powder is packed very closely after it is shaped into a green sheet, and therefore the organic solvent present in the interstices between the aluminum nitride particles can not readily be evaporated and escaped therefrom. Release of the evaporated binder occuring in the subsequent heating stage is also prevented by the very close packing of the aluminum nitride powder. Therefore, a green sheet made from an aluminum nitride starting powder prepared by the alumina reduction method tends to cause cracking during drying or binder removal, and its resistance to bending is deteriorated.

Figure 3:
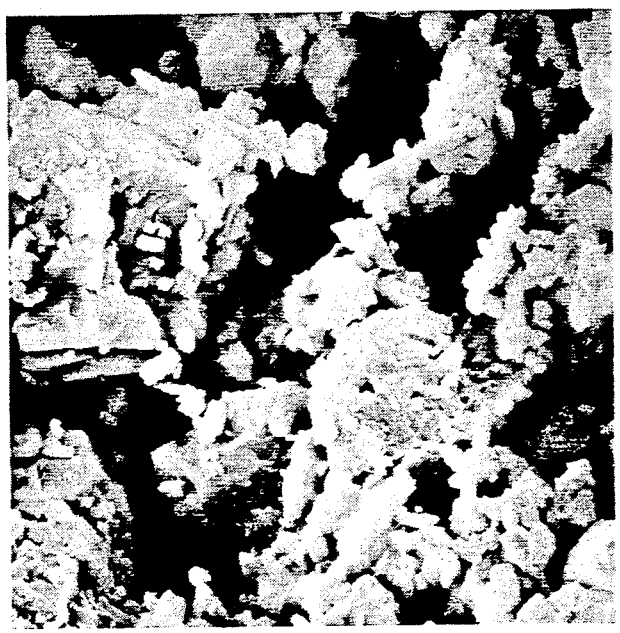
FIG. 3 is an electron micrograph of an aluminum nitride starting powder prepared by the direct nitriding of metallic aluminum.

On the other hand, as shown by the electron micrograph in FIG. 3, an aluminum nitride powder prepared by the direct nitriding method (nitriding of metallic aluminum) comprises agglomerates of primary particles of irregular polyangular shape (larger particles in the micrograph) which are interspersed with non-agglomerated primary particles (smaller particles in the micrograph), and hence it is easier with such powder to obtain a starting powder having the above-mentioned favorable size distribution (22% to 45% by volume being made up of particles having a diameter equal to or larger than 3 μm and 55% to 78% by volume being made up of particles having a diameter smaller than 3 μm). Compared to the starting powder in FIG. 2 prepared by the alumina reduction method, the starting powder in FIG. 3 prepared by the direct nitriding method has a much larger maximum particle diameter, and comprises those particles having a particle diameter equal to or greater than 3 μm in a relatively larger proportion.

When such aluminum nitride starting powder prepared by the direct nitriding method is used to make a green sheet by the doctor blade process, the particles are packed not so closely leaving sufficient interstices between the particles to enable the vaporized organic solvent and binder to readily escape. Thus, a green sheet with little cracking having an improved bending resistance can be obtained from such a starting powder.

A starting powder which comprises more than 78% by volume of fine particles having a diameter of smaller than 3 μm is packed very closely, while a starting powder comprising such fine particles in a proportion of less than 55% by volume is packed so loosely. In both cases, the resulting green sheets will tend to cause cracking during drying or binder removal and exhibit deteriorated resistance to bending. A more preferred aluminum nitride starting powder for use in making green sheets has a particle size distribution in which from 23% to 38% by volume of the powder is made up of particles having a diameter equal to or larger than 3 μm and from 62% to 77% by volume of the powder is made up of particles having a diameter smaller than 3 μm. A size distribution particularly suitable for use in making green sheets are as follows:

| Particle diameter | % by volume |
| --- | --- |
| ≦1.5 μm | 30–54 |
| ≦2 μm (including particles of ≦1.5 μm) | 40–66 |
| ≦3 μm (including particles of ≦2 μm) | 55–78 |
| ≦4 μm (including particles of ≦3 μm) | 64–86 |
| ≦5 μm (including particles of ≦4 μm) | 70–92 |
| ≦6 μm (including particles of ≦5 μm) | 75–98 |
| >6 μm | 2–25 |

When the production of a multilayered ceramic package comprised of two or more AlN sheets in the above-mentioned manner is conducted under the following conditions: use of an aluminum nitride starting powder prepared by the direct nitriding method and an organic polymeric binder of the above-mentioned butyral or acrylate polymer type (e.g., polyvinylbutyral); bulk density of the formed green sheet being 2.28 g/cm³ at most; use of a conductor paste based on tungsten; and baking conducted at a temperature of 1780°–1840° C. in a hydrogen-containing non-oxidized atmosphere, it is possible to obtain a high-quality AlN-based multilayered ceramic package having a very low volume resistivity of the conductor on the order of 25 μΩ.cm or less due to the high density of the conductor layer.

In the above-mentioned production of a multilayered substrate, when a resistor is used in place of the conductor, and it is applied on the surface of the green sheet by printing and processed in the same way, the resulting multilayered sintered body can serve as a ceramic heater. Examples of resistors useful for this purpose include carbides, borides and nitrides of transition metals, for example, TiN, TiC, SiC, WC, TaN, $ZrB_2$, and mixtures of these. When a ceramic heater is produced in the above manner, it is preferable to subject the surface of the sintered body to heat treatment at a temperature of 1000°–1300° C. to form an oxide film on the surface, whereby it is possible to provide improved resistance to oxidation at high temperatures.

Other articles which can be produced from a green sheet prepared as above from an aluminum nitride powder obtained by the direct nitriding method include substrates for PGA (pin grid arrays), radiator plates for multilayered packages or PGA.

The surface of the sintered body of the present invention may be coated with a metal such as W, Mo, or Mn by means of metalizing, or a thick-film circuit of a noble metal such as Ag, Au, or Ag-Pd may be formed on the surface thereof.

When a ceramic is used as a substrate for packaging IC devices, it is known that if the α-ray count of the substrate is greater than 0.1 CPH/cm², radiation may occasionally interfere with the normal operation of the packaged IC devices. The α-ray count of the sintered body of the present invention is determined to be in the range of 0.005±0.003 CPH/cm².

The following examples are given as specific illustrations of the present invention. It should be noted, however, that the specific details set forth in the examples are merely illustrative and are in no manner meant to be limitative. In the examples, all the percents are by weight unless otherwise indicated.

EXAMPLE 1

Various aluminum nitride powders were prepared by direct nitriding of metallic aluminum for use as a starting powder to make a sintered body. The oxygen content, Si content, purity and average particle diameter of each powder is summarized in Table 1 below. To these powders, $Y_2O_3$ powder (average particle diameter: 1.3 μm) as a sintering additive, and optionally $Al_2O_3$ powder (average particle diameter: 1.5 μm) and $Si_3N_4$ powder (average particle diameter: 0.9 μm) were added, and the mixtures were ball milled in methanol or toluene to yield powder mixtures having an average particle diameter of at most 2.5 μm, an Si content of 1.3% by weight or less, and an oxygen content of about 6% by weight or less. The proportions of the starting AlN powder and the additives used in the preparation of each powder mixture are shown in Table 2 below. In each of Samples Nos. 1–13, 8", and 35–50, the powder mixture was shaped by adding to the powder mixture 6% by weight of paraffin wax and 1% by weight of stearic acid as binders and pressing into a compact of 12 mm in diameter under pressure of 1000 kg/cm². In each of Samples Nos. 14–34, the powder mixture in the form of a slurry was shaped into a sheet by the doctor blade process after a polyvinylbutyral as a binder and dibutyl phthalate as a plasticizer were added to the slurry. These shaped forms were baked at a temperature of 1800°–1840° C. for 0.5 hour in a nitrogen atmosphere to yield samples of aluminum nitride sintered bodies.

As described above, $Al_2O_3$ powder or $Si_3N_4$ powder was added in a minor amount in the preparation of the powder mixture in some samples. It is expected that these additives would usually be present in an aluminum nitride sintered body, since they are not only often contained in an aluminum nitride starting powder but also often enter the sintered body in the course of the production process, for example, in a pulverization step. Therefore, these additives were added in the preparation of some samples in order to evaluate the effect of these additives on the thermal conductivity or other properties of the finally obtained sintered body.

The properties of each sample of the sintered bodies thus obtained were measured with respect to thermal conductivity (by the laser flash method), density (by the Archimedes' method), and bending strength (by the 3-point bending test as defined in JIS R-1601). The results are also indicated in Table 2, Part B. Table 2, Part A includes the data on proportions of the starting powder and additives used in the preparation of the powder mixture, weight ratio of [$Al_2O_3/Y_2O_3$] in the powder mixture calculated from the individual proportions therein, average particle diameter of the powder mixture, and baking temperature of the shaped powder mixture, and Table 2, Part B includes, in addition to the above properties of the sintered body, the data on yttrium content of the resulting sintered body [Y] and $Y_2O_3$-converted Y content calculated from the Y content [$Y_2O_3$], residual oxygen content thereof [$O_2$] and $Al_2O_3$-converted residual oxygen content calculated from the residual oxygen content [$Al_2O_3$], Si content of the sintered body [Si], weight ratio of the $Al_2O_3$-converted residual oxygen content to the $Y_2O_3$-converted Y content [$Al_2O_3/Y_2O_3$], and weight ratio of the Si content to the Y content of the sintered body [Si/Y]. Each content is expressed in weight percent.

The total oxygen content of the starting powders and the sintered bodies was determined by an infrared absorption spectrometer (manufactured by LECO, model TC-136), and the Si content was determined by an ICP emission spectroscopic analyzer (manufactured by Seiko Denshi Kogyo). In this and following examples, average particle diameters and particle size distributions were determined by the centrifugal precipitation method in isopropyl alcohol as a solvent using an equipment manufactured by Horiba Seisakusho (Model CAPA-500).

Figure 4:
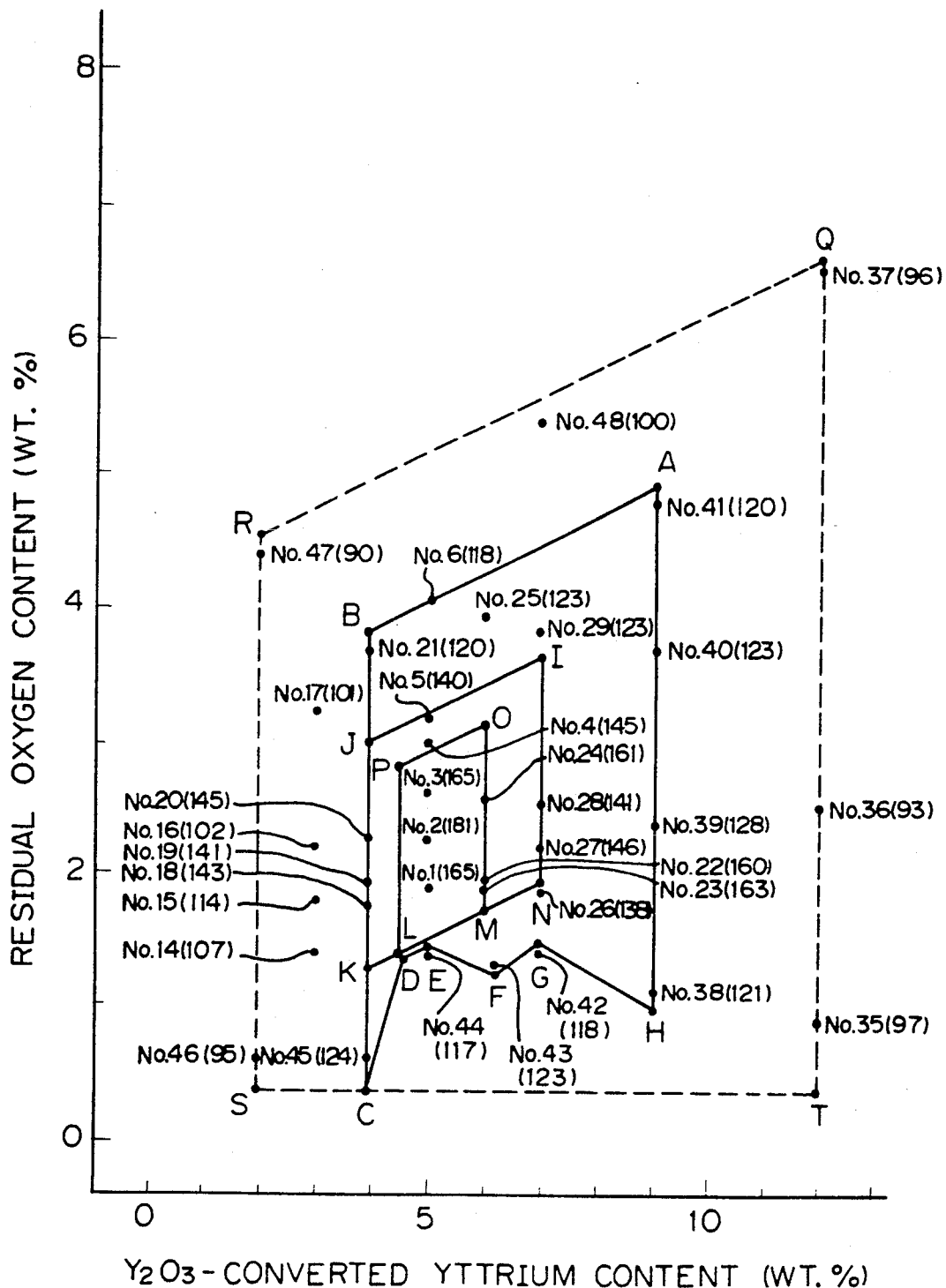
FIG. 4 shows the data of the $Y_2O_3$-converted yttrium content and the residual oxygen content obtained in Example 1, which are plotted on the same chart as FIG. 1.

The $Y_2O_3$-converted Y content and the residual oxygen content of the sintered samples are plotted in FIG. 4 using the same chart as FIG. 1. The figures in parentheses next to each sample number in FIG. 4 indicate the value of thermal conductivity in W/mK of the sintered sample.

TABLE 1

| Sample No. | Oxygen (%) | Si (%) | Purity (%) | Average particle diameter (μm) |
|---|---|---|---|---|
| 1–13 | 1.50 | 0.015 | 99.8 | 2.1 |
| 14–29 | 1.38 | 0.012 | " | 2.0 |
| 30 | 1.40 | 0.011 | " | 2.7 |
| 31 | 1.26 | 0.016 | " | 2.3 |
| 32 | 1.40 | 0.011 | " | 2.7 |
| 33 | 1.39 | 0.011 | " | 1.9 |
| 34 | 1.50 | 0.015 | " | 2.1 |
| 8" | 1.76 | 0.011 | " | 2.0 |
| 35, 37 | 1.47 | 0.015 | " | 2.1 |
| 38, 42–45 | 1.21 | 0.613 | 99.2 | 1.9 |
| 36, 39–41, 46–48 | 1.26 | 0.012 | 99.8 | 2.3 |
| 49 | 3.04 | 0.52 | 99.4 | 1.8 |
| 50 | 2.00 | 0.79 | 99.1 | 2.0 |

TABLE 2

[Part A]

| | Proportion of AlN and additive in powder mixture | | | | | Average particle | Baking |
| Sample No. | AlN (%) | $Y_2O_3$ (%) | $Al_2O_3$ (%) | $Si_3N_4$ (%) | $Al_2O_3/Y_2O_3$ | diameter of powder mixture (μm) | temp. (°C.) |
|---|---|---|---|---|---|---|---|
| 1 | 95.0 | 5 | 0.0 | 0.0 | 0.00 | 1.4 | 1800 |
| 2 | 94.8 | " | 0.2 | " | 0.04 | " | " |
| 3 | 94.5 | " | 0.5 | " | 0.10 | " | " |
| 4 | 94.0 | " | 1.0 | " | 0.20 | " | " |
| 5 | 93.0 | " | 2.0 | " | 0.40 | " | " |
| 6 | 90.0 | " | 5.0 | " | 1.00 | " | " |
| 7 | 85.0 | " | 10.0 | " | 2.00 | " | " |
| 8 | 94.73 | " | 0.0 | 0.27 | 0.00 | " | " |
| 9 | 94.43 | " | 0.0 | 0.57 | 0.00 | " | " |
| 10 | 93.93 | " | 0.0 | 1.07 | 0.00 | " | " |
| 11 | 92.93 | " | 0.0 | 2.07 | 0.00 | " | " |
| 12 | 89.93 | " | 0.0 | 5.07 | 0.00 | " | " |
| 13 | 84.93 | " | 0.0 | 10.07 | 0.00 | " | " |
| 8" | 95.0 | " | 0.0 | 0.0 | 0.00 | " | " |
| 14 | 97.0 | 3 | 0.0 | " | 0.00 | 1.8 | 1830 |
| 15 | 96.5 | 3 | 0.5 | " | 0.17 | " | " |
| 16 | 95.0 | 3 | 2.0 | " | 0.67 | " | " |
| 17 | 92.0 | 3 | 5.0 | " | 1.67 | " | " |
| 18 | 96.0 | 4 | 0.0 | " | 0.00 | " | " |
| 19 | 95.5 | 4 | 0.5 | " | 0.13 | " | " |
| 20 | 94.0 | 4 | 2.0 | " | 0.50 | " | " |
| 21 | 91.0 | 4 | 5.0 | " | 1.25 | " | " |
| 22 | 94.0 | 6 | 0.0 | " | 0.00 | " | " |
| 23 | 93.5 | 6 | 0.5 | " | 0.08 | " | " |
| 24 | 92.0 | 6 | 2.0 | " | 0.33 | " | " |
| 25 | 89.0 | 6 | 5.0 | " | 0.83 | " | " |
| 26 | 93.0 | 7 | 0.0 | " | 0.00 | " | " |
| 27 | 92.5 | 7 | 0.5 | " | 0.07 | " | " |
| 28 | 91.0 | 7 | 2.0 | " | 0.29 | " | " |
| 29 | 88.0 | 7 | 5.0 | " | 0.71 | " | " |
| 30 | 95.0 | 5 | 0.0 | " | 0.00 | 2.3 | 1810 |
| 31 | 95.0 | 5 | 0.0 | 0.0 | 0.00 | 2.0 | 1810 |
| 32 | 95.0 | 5 | 0.0 | " | 0.00 | 2.3 | " |
| 33 | 95.0 | 5 | 0.0 | " | 0.00 | 1.7 | " |
| 34 | 95.0 | 5 | 0.0 | " | 0.00 | 1.7 | " |

TABLE 2-continued

[Part A]

| Sample No. | Proportion of AlN and additive in powder mixture | | | | | Average particle diameter of powder mixture (μm) | Baking temp. (°C.) |
|---|---|---|---|---|---|---|---|
| | AlN (%) | Y₂O₃ (%) | Al₂O₃ (%) | Si₃N₄ (%) | Al₂O₃/Y₂O₃ | | |
| 35 | 88.0 | 12 | 0.0 | " | 0.00 | 1.7 | 1840 |
| 36 | 87.0 | 12 | 1.0 | " | 0.08 | 1.8 | 1820 |
| 37 | 81.0 | 12 | 7.0 | " | 0.58 | 1.7 | 1840 |
| 38 | 91.0 | 9 | 0.0 | " | 0.00 | 1.7 | 1830 |
| 39 | 90.5 | 9 | 0.5 | " | 0.06 | 1.8 | 1820 |
| 40 | 88.0 | 9 | 3.0 | " | 0.33 | 1.8 | " |
| 41 | 86.0 | 9 | 5.0 | " | 0.56 | 1.8 | " |
| 42 | 93.0 | 7 | 0.0 | " | 0.00 | 1.7 | 1830 |
| 43 | 94.0 | 6 | 0.0 | " | 0.00 | 1.7 | " |
| 44 | 95.0 | 5 | 0.0 | " | 0.00 | 1.7 | " |
| 45 | 96.0 | 4 | 0.0 | " | 0.00 | 1.7 | " |
| 46 | 98.0 | 2 | 0.0 | " | 0.00 | 1.8 | 1820 |
| 47 | 93.0 | 2 | 5.0 | " | 2.50 | 1.8 | " |
| 48 | 87.0 | 7 | 6.0 | " | 0.86 | 1.8 | " |
| 49 | 95.0 | 5 | 0.0 | " | 0.00 | 1.5 | " |
| 50 | 95.0 | 5 | 0.0 | " | 0.00 | 1.7 | " |

TABLE 2

[Part B]

| Sample No. | Composition of sintered body | | | | | Properties of sintered body | | |
|---|---|---|---|---|---|---|---|---|
| | Y(Y₂O₃) (%) | O₂(Al₂O₃) (%) | Si (%) | Al₂O₃/Y₂O₃ Al₂O₃/Y₂O₃ | Si/Y | Thermal conductivity (W/mK) | Relative density (%) | Bending strength (Kg/mm³) |
| 1 | 3.94(5.0) | 1.93(4.10) | 0.160 | 0.82 | 0.0406 | 165 | 99.9 | 45 |
| 2 | " | 2.30(4.89) | 0.042 | 0.98 | 0.0106 | 181 | 100.0 | 47 |
| 3 | " | 2.67(5.67) | 0.128 | 1.13 | 0.0325 | 165 | 100.0 | 48 |
| 4 | " | 2.99(6.35) | N.D. | 1.27 | N.D. | 145 | 99.8 | 47 |
| 5 | " | 3.20(6.80) | N.D. | 1.26 | N.D. | 140 | 99.5 | 46 |
| 6 | " | 4.08(8.67) | N.D. | 1.73 | N.D. | 118 | 99.3 | 40 |
| 7 | " | >5.3(>10.0) | N.D. | N.D. | N.D. | 65 | 96.6 | 24 |
| 8 | " | 1.95(4.14) | 0.250 | 0.88 | 0.0635 | 145 | 99.6 | 52 |
| 9 | " | 1.87(3.97) | 0.430 | 0.78 | 0.1090 | 140 | 99.6 | 47 |
| 10 | " | 1.49(3.17) | 0.820 | 0.61 | 0.2080 | 120 | 99.0 | 45 |
| 11 | " | 1.09(2.32) | 1.240 | 0.46 | 0.3150 | 102 | 99.2 | 44 |
| 12 | " | N.D. | 3.040 | N.D. | 0.7720 | 40 | 99.1 | 30 |
| 13 | " | N.D. | N.D. | N.D. | N.D. | 14 | 96.9 | 30 |
| 8" | " | 1.98(4.21) | 0.008 | 0.84 | 0.0020 | 171 | 99.3 | 45 |
| 14 | 2.36(3.0) | 1.43(3.04) | N.D. | 1.04 | N.D. | 107 | 97.9 | 42 |
| 15 | " | 1.82(3.87) | N.D. | 1.29 | N.D. | 114 | 99.3 | 43 |
| 16 | " | 2.15(4.57) | N.D. | 1.52 | N.D. | 102 | 99.0 | 41 |
| 17 | " | 3.24(6.89) | N.D. | 2.30 | N.D. | 101 | 98.7 | 39 |
| 18 | 3.15(4.0) | 1.78(3.78) | N.D. | 0.95 | N.D. | 143 | 98.1 | 42 |
| 19 | " | 1.97(4.18) | N.D. | 1.05 | N.D. | 141 | 97.2 | 45 |
| 20 | " | 2.33(4.95) | N.D. | 1.24 | N.D. | 145 | 98.5 | 44 |
| 21 | " | 3.67(7.80) | N.D. | 1.95 | N.D. | 120 | 98.4 | 39 |
| 22 | 4.72(6.0) | 1.97(4.18) | N.D. | 0.70 | N.D. | 160 | 99.6 | 44 |
| 23 | " | 1.95(4.14) | N.D. | 0.69 | N.D. | 163 | 98.8 | 49 |
| 24 | " | 2.61(5.54) | N.D. | 0.92 | N.D. | 161 | 98.4 | 47 |
| 25 | " | 3.95(8.39) | N.D. | 1.40 | N.D. | 123 | 99.8 | 45 |
| 26 | 5.51(7.0) | 1.84(3.91) | N.D. | 0.56 | N.D. | 138 | 99.1 | 47 |
| 27 | " | 2.21(4.69) | N.D. | 0.67 | N.D. | 146 | 99.6 | 51 |
| 28 | " | 2.58(5.48) | N.D. | 0.78 | N.D. | 141 | 100.0 | 49 |
| 29 | " | 3.85(8.18) | N.D. | 1.17 | N.D. | 123 | 99.3 | 42 |
| 30 | 3.94(5.0) | 1.67(3.55) | 0.122 | 0.71 | 0.0310 | 165 | 100.6 | 46 |
| 31 | 3.94(5.0) | 1.78(3.78) | 0.054 | 0.76 | 0.0140 | 179 | 100.2 | 44 |
| 32 | " | 1.83(3.89) | 0.065 | 0.78 | 0.0170 | 169 | 99.1 | 45 |
| 33 | " | 2.07(4.40) | 0.101 | 0.88 | 0.0260 | 167 | 100.4 | 45 |
| 34 | " | 2.73(5.80) | 0.044 | 1.16 | 0.0110 | 165 | 99.9 | 47 |
| 35 | 9.45(12.0) | 0.88(1.87) | N.D. | 0.16 | N.D. | 97 | 98.8 | 45 |
| 36 | 9.45(12.0) | 2.50(5.31) | N.D. | 0.44 | N.D. | 93 | 99.1 | 48 |
| 37 | 9.45(12.0) | 6.63(14.1) | N.D. | 1.18 | N.D. | 96 | 96.5 | 34 |
| 38 | 7.09(9.0) | 1.13(2.40) | N.D. | 0.27 | N.D. | 121 | 99.0 | 47 |
| 39 | 7.09(9.0) | 2.43(5.16) | N.D. | 0.57 | N.D. | 128 | 98.5 | 49 |
| 40 | 7.09(9.0) | 3.76(7.99) | N.D. | 0.89 | N.D. | 123 | 98.9 | 50 |
| 41 | 7.09(9.0) | 4.81(10.2) | N.D. | 1.13 | N.D. | 120 | 97.7 | 40 |
| 42 | 5.51(7.0) | 1.40(2.97) | N.D. | 0.42 | N.D. | 118 | 99.4 | 46 |
| 43 | 4.88(6.2) | 1.42(2.80) | N.D. | 0.45 | N.D. | 123 | 99.5 | 44 |
| 44 | 3.94(5.0) | 1.39(2.95) | N.D. | 0.59 | N.D. | 117 | 99.3 | 44 |
| 45 | 3.15(4.0) | 0.56(1.19) | N.D. | 0.30 | N.D. | 124 | 99.7 | 39 |
| 46 | 1.57(2.0) | 0.57(1.21) | N.D. | 0.61 | N.D. | 95 | 98.4 | 37 |
| 47 | 1.57(2.0) | 4.40(9.35) | N.D. | 4.68 | N.D. | 90 | 95.8 | 32 |
| 48 | 5.51(7.0) | 5.35(11.4) | N.D. | 1.63 | N.D. | 100 | 97.1 | 37 |
| 49 | 3.94(5.0) | N.D. | N.D. | N.D. | N.D. | 96 | — | — |

TABLE 2-continued

[Part B]

| Sample No. | Composition of sintered body | | | | | Properties of sintered body | | |
|---|---|---|---|---|---|---|---|---|
| | Y(Y$_2$O$_3$) (%) | O$_2$(Al$_2$O$_3$) (%) | Si (%) | Al$_2$O$_3$/Y$_2$O$_3$ Al$_2$O$_3$/Y$_2$O$_3$ | Si/Y | Thermal conductivity(W/mK) | Relative density (%) | Bending strength (Kg/mm$^3$) |
| 50 | 3.94(5.0) | N.D. | N.D. | N.D. | N.D. | 95 | — | — |

N.D. = Not Determined

As can be seen from FIG. 4, when the plot of the Y$_2$O$_3$-converted Y content against the residual oxygen content lies on any of lines Q-R-S-T-Q which defines a quadrilateral, the thermal conductivity of the sintered bodies does not reach 100 W/mK. When the plot is located within this quadrilateral, however, the thermal conductivity of the sintered body increases to at least 100 W/mK. In the cases where the plot of the Y$_2$O$_3$-converted Y content against the residual oxygen content is located within the region defined by lines A-B-C-D-E-F-G-H-A (including on the lines), the sintered bodies exhibit a thermal conductivity of at least 120 W/mK. When the plot is located within the region defined by lines I-J-K-N-I (including on the lines), the sintered bodies exhibit a thermal conductivity of at least 140 W/mK. In the cases where the plot is located within the region defined by lines O-P-L-M-O (including on the lines), the sintered bodies exhibit a very high thermal conductivity of at least 160 W/mK.

From the results indicated in Table 2, it can be seen that when the weight ratio of the Al$_2$O$_3$-converted residual oxygen content to the Y$_2$O$_3$-converted Y content and the individual values of these contents are within the respective ranges described previously, the aluminum nitride sintered bodies have improved bending strength in addition to improved thermal conductivity.

The comparison of results of Samples Nos. 1 and 2 with Samples Nos. 8-11 in Table 2 teaches that although Samples Nos. 8-11 have a low residual oxygen content in the range of 1.95%-1.09% by weight which is comparable to or lower than those of Samples Nos. 1 and 2, these samples exhibit rather lower values of thermal conductivity due to the higher Si content. The results of Samples Nos. 30-34 also teach the same tendency caused by the presence of Si. Thus, a decrease in Si content in addition to a decrease in oxygen content is effective for the purpose of improving thermal conductivity. From the results shown in Table 2, it is also suggested that in a sintered body having high thermal conductivity the weight ratio of the Si content to the Y content and the individual values of these contents in the sintered body are kept within the above-mentioned respective ranges. The sintered bodies of Samples Nos. 49 and 50 which were prepared from a starting powder containing 1.8% or more oxygen could not exhibit a thermal conductivity of at least 100 W/mK.

EXAMPLE 2

The crystal phases formed in the grain boundaries of the sintered bodies of Samples Nos. 1-34 prepared in Example 1 were identified and analyzed by powder X-ray diffractometry and the results are summarized in Table 3 below. In Table 3, the measured value in the crystal phase having the highest peak in the diffraction pattern is taken as 100%, and the values in the remaining crystal phases are expressed as percentages relative to the value in the highest peak phase.

TABLE 3

| Sample No. | Y$_2$O$_3$ (3.06) | Al$_2$Y$_4$O$_9$ (3.02) | AlYO$_3$ (2.61) | Al$_5$Y$_3$O$_{12}$ (1.66) | AlN.Al$_2$O$_3$ spinel (1.52) | YN (2.82) | Other phase |
|---|---|---|---|---|---|---|---|
| 1 | — | 38 | 100 | — | — | — | |
| 2 | — | 38 | 100 | — | — | — | — |
| 3 | — | 30 | 100 | — | — | — | — |
| 4 | — | 15 | 100 | 15 | 14 | — | — |
| 5 | — | 23 | 100 | 80 | 24 | — | — |
| 6 | — | — | — | 100 | 22 | — | — |
| 7 | — | — | — | 100 | 66 | — | — |
| 8 | 25 | 73 | 100 | — | — | — | — |
| 9 | — | 65 | 100 | — | — | — | — |
| 10 | 12 | 100 | 7 | 24 | — | — | — |
| 11 | — | — | — | N.D. | — | — | N.D. (unknown phase) |
| 12 | — | — | — | — | — | — | N.D. (unknown phase) |
| 13 | — | — | — | — | — | — | N.D. (27R-polytype) / N.D. (unknown phase) |
| 14 | — | 17 | — | 100 | — | — | — |
| 15 | — | — | — | 100 | — | — | — |
| 16 | — | — | — | 100 | — | — | — |
| 17 | — | — | — | 61 | 100 (2.40)* | — | — |
| 18 | — | 22 | 100 | 22 | — | — | — |
| 19 | — | — | 28 | 100 | — | — | — |
| 20 | — | — | — | 100 | — | — | — |
| 21 | — | — | — | 96 | 100 (2.40)* | — | — |
| 22 | — | 25 | 100 | — | — | — | — |
| 23 | — | — | 100 | 7 | — | — | — |
| 24 | — | — | 38 | 100 | — | — | — |
| 25 | — | — | — | 100 | 55 | — | — |
| 26 | — | 67 | 100 | — | — | — | — |
| 27 | — | 7 | 100 | — | — | — | — |
| 28 | — | — | 100 | 73 | — | — | — |

TABLE 3-continued

| Sample No. | $Y_2O_3$ (3.06) | $Al_2Y_4O_9$ (3.02) | $AlYO_3$ (2.61) | $Al_5Y_3O_{12}$ (1.66) | $AlN.Al_2O_3$ spinel (1.52) | YN (2.82) | Other phase |
|---|---|---|---|---|---|---|---|
| 29 | — | — | — | 100 | 37 | — | — |
| 30 | — | — | 100 | 47 | — | 30 | — |
| 31 | — | 100 | — | — | — | — | — |
| 32 | — | 100 | — | — | — | — | — |
| 33 | — | 100 | — | — | — | — | — |
| 34 | — | 12 | 100 | 19 | 15 | — | — |

— = No detected
N.D. = Not determined
Figures in parenthisis beneath each crystal phase is the value of "d" in at which the peak of the phase was measured.
*measured at d = 2.40 angstom From the results shown in Tables 2 and 3, it can be seen that those samples in which the major phase is $Al_2Y_4O_9$ exhibit a thermal conductivity of at least 167 W/mK except for Sample No. 10 having a high Si content, while those samples in which the major phase is $AlYO_3$ exhibit a thermal conductivity of 138 W/mK or higher, and those samples in which the major phase is $Al_5Y_3O_{12}$ exhibit a thermal conductivity of 102 W/mK or higher except for Sample No. 7 having a high oxygen content.

EXAMPLE 3

An aluminum nitride powder prepared by the direct nitriding method was mixed with a sintering additive consisting of $Y_2O_3$ and if necessary $Al_2O_3$ or $Si_3N_4$ powder was added to the mixture in order to adjust the composition thereof. The mixture was then wet pulverized in methanol or toluene to give a powder mixture, to which 6% by weight of paraffin wax and 1% by weight of stearic acid were added as binders, and shaped by cold pressing under pressure of 1000 kg/cm² to give a compact having a diameter of 12 mm. In some cases, the powder mixture was shaped into a sheet by the doctor blade process using polyvinylbutyral as a binder, and the resulting sheet was dried and heated to remove the binder in the conventional manner.

The resulting green shaped body prepared above was baked in a nitrogen atmosphere at a temperature of 1600°–1900° C. by hot pressing (HP), pressureless sintering (PS), gas pressure sintering (GPS), hot isostatic pressing (HIP), or pressureless sintering followed by hot isostatic pressing (PL—HIP) to yield a sample of an aluminum nitride sintered body. The elemental composition (% by weight) and average particle diameter of the powder mixture, shaping method thereof, and baking method and conditions of the shaped green body in each sample are summarized in Table 4 below.

In order to determine the composition of the metallic elements present in the grain boundary phases (in weight percent based on the total metallic content in the grain boundary phases), each sintered sample prepared above was analyzed for the metallic constiuents present in the grain boundary phases as follows. The sample was observed under an scanning electron microscope to find grain boundary phases. Some of the grain boundary phases confirmed clearly in the above observation were selected at random and assayed for the metallic constituents by an X-ray microanalyzer, and the average of the thus determined values of each metallic content was calculated and indicated in Table 5 below. The X-ray microanalyzer was accelerated at a voltage of 15 kV. Table 5 also includes the data on thermal conductivity, bending strength (3-point bending), and relative density of each sample which were determined in the same manner as described in Example 1.

TABLE 4

| Sample No. | Elemental composition of powder mixture (wt. %) | | | | | Average particle diameter of powder mixture (μm) | Shaping method* | Baking method** | Baking conditions | | |
|---|---|---|---|---|---|---|---|---|---|---|---|
| | Al | N | Y | Si | O | | | | Temp. (°C.) | Duration (hr) | Pressure (Kg/cm²) |
| 1 | 59.0 | 29.5 | 8.1 | 0.088 | 3.1 | 0.9 | — | HP | 1600 | 2 | 300 |
| 2 | 60.3 | 31.1 | 5.5 | 0.059 | 2.6 | 1.4 | P | PL | 1860 | 0.5 | — |
| 3 | 61.9 | 31.8 | 3.9 | 0.049 | 2.3 | 1.9 | G | PL | 1810 | 0.4 | — |
| 4 | 61.9 | 31.7 | 3.9 | 0.057 | 2.5 | 1.8 | G | GPS | 1900 | 0.5 | 10 |
| 5 | 62.7 | 31.6 | 3.5 | 0.063 | 2.1 | 1.8 | G | GPS | 1900 | 0.5 | 5 |
| 6 | 62.5 | 30.8 | 4.3 | 0.051 | 2.2 | 1.3 | P | HP | 1700 | 0.5 | 300 |
| 7 | 63.9 | 32.2 | 2.3 | 0.19 | 1.6 | 1.6 | G | PL | 1830 | 0.5 | — |
| 8 | 64.9 | 32.4 | 1.2 | 0.18 | 1.1 | 1.3 | P | PL | 1860 | 1.0 | — |
| 9 | 62.2 | 31.1 | 4.2 | 0.45 | 2.0 | 1.3 | P | PL | 1750 | 0.5 | — |
| | | | | | | | | → HIP | 1800 | 1.0 | 2000 |
| 10 | 63.0 | 31.5 | 3.1 | 0.43 | 1.9 | 1.6 | G | PL | 1830 | 0.5 | — |
| 11 | 59.2 | 29.7 | 7.9 | 0.093 | 3.1 | 0.9 | P | PL | 1830 | 0.5 | — |
| 12 | 58.9 | 29.9 | 7.8 | 0.090 | 3.2 | 1.5 | G | PL | 1750 | 0.5 | — |
| | | | | | | | | → HIP | 1800 | 2.0 | 2000 |
| 13 | 62.6 | 31.2 | 3.7 | 0.25 | 2.2 | 1.4 | P | PL | 1830 | 0.5 | — |
| 14 | 61.9 | 30.9 | 4.0 | 0.047 | 3.1 | 1.7 | G | PL | 1830 | 1.33 | — |
| 15 | 63.4 | 31.5 | 3.0 | 0.061 | 2.0 | 1.4 | P | PL | 1860 | 1.0 | — |
| 16 | 61.5 | 31.0 | 3.8 | 0.045 | 3.5 | 1.4 | P | PL | 1860 | 1.0 | — |

*Shaping method:
G: green sheet formation
P: pressing
**Baking method:
PL: pressureless sintering
HP: hot pressing
GPS: gas pressure sintering
HIP: hot isostatic pressing

TABLE 5

| Sample No. | Metallic composition of grain boundary phase (wt. %) | | | Thermal conductivity (W/mK) | Bending strength (Kg/mm$^2$) | Relative density (%) |
|---|---|---|---|---|---|---|
| | Y | Si | Al | | | |
| 1* | (92.1) | 1.9 | 5.9 | 133 | 38 | 100.6 |
| 2 | 90.6 | 1.1 | 8.2 | 160 | 46 | 99.9 |
| 3 | 80.3 | 1.1 | 18.3 | 182 | 45 | 99.9 |
| 4 | 78.8 | 1.0 | 19.8 | 179 | 47 | 100.0 |
| 5 | 76.6 | 1.1 | 22.0 | 173 | 48 | 100.0 |
| 6 | 73.2 | 0.9 | 25.5 | 151 | 47 | 99.8 |
| 7 | 62.1 | 5.9 | 31.6 | 148 | 50 | 100.0 |
| 8* | (59.7) | 6.1 | 33.8 | 128 | 41 | 99.2 |
| 9 | 74.5 | 8.5 | 17.0 | 140 | 47 | 100.2 |
| 10* | 70.4 | (10.7) | 18.8 | 136 | 36 | 99.4 |
| 11* | 89.0 | 3.1 | (7.7) | 135 | 38 | 99.8 |
| 12 | 88.1 | 3.3 | 8.5 | 148 | 39 | 99.7 |
| 13 | 77.4 | 4.9 | 17.7 | 151 | 52 | 99.6 |
| 14 | 67.3 | 0.9 | 31.5 | 145 | 46 | 99.5 |
| 15 | 64.4 | 1.2 | 34.0 | 141 | 35 | 99.2 |
| 16* | 62.3 | 1.3 | (36.1) | 130 | 34 | 99.0 |

*Comparative

From the results in Table 5, it can be seen that each sample showed a high thermal conductivity of not lower than 120 W/mK. Among others, a sample having a composition of metallic elements in the grain boundary phases which comprised 60-91% by weight of Y, 8-35% by weight of Al, and not greater than 10% by weight of Si showed a thermal conductivity of at least 140 W/mK. When the composition of metallic elements in the grain boundary phases comprised 70-91% by weight of Y, 8-25% by weight of Al, and not greater than 3% by weight of Si, an extremely high thermal conductivity of at least 160 W/mK was obtained. On the contrary, the samples marked with an asterisk are comparative, since the Y, Al, or Si content in the grain boundary phases die not fall within the above, first wider range and they exhibited a thermal conductivity which did not exceed 140 W/mK, although the thermal conductivity of these samples exceeded 120 W/mK.

EXAMPLE 4

The four aluminum nitride powders having the particle size distributions (in volume percent) shown below which were prepared by the direct nitriding method or the alumina reduction method were used as starting powders to prepare green sheets by the doctor blade process.

| Mark | Prepared by | Size distribution | | Average particle diameter |
|---|---|---|---|---|
| | | ≧3 μm | <3 μm | |
| A | Direct nitriding | 22 vol. % | 78 vol. % | about 1.3 μm |
| B | Direct nitriding | 45 vol. % | 55 vol. % | about 2.7 μm |
| C | Alumina reduction | 5 vol. % | 95 vol. % | about 1.1 μm |
| D | Alumina reduction | 8 vol. % | 92 vol. % | about 1.3 μm |

Each green sheet was prepared by adding Y$_2$O$_3$ as a sintering additive, polyvinylbutyral, polyisobutyl methacrylate, polybutylmethacrylate, or a copolymer of methyl methacrylate and ethyl acrylate as a binder, and optionally dibutyl phthalate as a plasticizer to the starting powder in the amounts indicated in Table 6 below, and ball milling the mixture in toluene as a solvent for 17 hours to form a slurry having a predetermined level of viscosity. The slurry was shaped into a sheet by the doctor blade process, dried to remove the solvent and finally heated to remove the binder, yielding a green sheet. The appearance (e.g., occurrence of cracks or wrinkles), thickness, and the green density of the dried green sheet before removal of the binder, and the appearance, resistance to bending, and the green density of the green sheet after removal of the binder were evaluated. The results are also shown in Table 6.

TABLE 6

| Sample No. | AlN powder (Type) (g) | Y$_2$O$_3$ (g) | Binder (g)* | Plasticizer (g)* | Slurry viscosity (p) | Appearance of sheet after drying | Sheet thickness (mm) | Green density (g/cm$^3$) | Appearance of sheet after binder removal | Bending resistance | Green density after binder removal (g/cm$^3$) |
|---|---|---|---|---|---|---|---|---|---|---|---|
| 1 | (A) 1900 | 100 | 200 (PVB) | 80 (DBP) | 34 | Good | 0.53 | 2.15 | Good | Good | 1.86 |
| 2 | (A) 1880 | 120 | 200 (PVB) | 100 (DBP) | 30 | " | 0.48 | 2.18 | " | " | 1.87 |
| 3 | (B) 1900 | 100 | 240 (PVB) | 100 (DBP) | 38 | " | 0.40 | 2.20 | " | " | 1.85 |
| 4 | (B) 1900 | 100 | 300 (PBMA) | — | 42 | " | 0.46 | 2.10 | " | " | 1.79 |
| 5 | (A) 1880 | 120 | 200 (PIBMA) | 80 (DBP) | 35 | Fair (Slight hair cracks) | 0.48 | 2.08 | " | " | 1.81 |
| 6 | (B) 1860 | 140 | 240 (PBMA) | 100 (DBP) | 38 | Fair (Slight hair cracks) | 0.51 | 2.08 | " | " | 1.79 |
| 7 | (A) 1880 | 120 | 320 (PIBMA) | — | 40 | Fair (Slight wrinkles) | 0.49 | 2.12 | " | " | 1.80 |
| 8 | (B) 1900 | 100 | 320 (PBMA) | 10 (DBP) | 44 | Fair (Slight wrinkles) | 0.45 | 2.14 | " | " | 1.78 |
| 9 | (B) | 100 | 240 | — | 60 | Good | 0.58 | 2.06 | " | " | 1.83 |

TABLE 6-continued

| Sample No. | AlN powder (Type) (g) | Y₂O₃ (g) | Binder (g)* | Plasticizer (g)* | Slurry viscosity (p) | Appearance of sheet after drying | Sheet thickness (mm) | Green density (g/cm³) | Appearance of sheet after binder removal | Bending resistance | Green density after binder removal (g/cm³) |
|---|---|---|---|---|---|---|---|---|---|---|---|
| 10 | 1900 (C) 1900 | 100 | (MMA + EA) 200 (PVB) | 80 (DBP) | — | Poor (Large cracks) | 0.50 | 2.31 | Cracks | Cracks | 2.01 |
| 11 | (C) 1880 | 120 | 240 (PVB) | 100 (DBP) | — | Poor (Large cracks) | 0.43 | 2.34 | " | " | 1.99 |
| 12 | (D) 1880 | 120 | 200 (PIBMA) | 80 (DBP) | — | Poor (Many cracks) | 0.48 | 2.29 | " | " | 1.98 |
| 13 | (D) 1860 | 140 | 240 (PBMA) | 100 (DBP) | — | Poor (Many cracks) | 0.48 | 2.30 | " | " | 1.97 |

*(PVB) = Polyvinylbutyral
(PIBMA) = Polyisobutyl methacrylate
(PBMA) = Polybutyl methacrylate
(DEP) = Dibutyl phthalate
(MMA + EA) = Methyl methacrylate/ethyl acrylate copolymer The binder removal was effected by heating the dried sheet to 600° C. at a rate of 50° C./hr in air and maintaining it at that temperature for 1 hour with respect to Samples Nos. 1-5, and 10-13, or by heating the dried sheet to 1000° C. at a rate of 50° C./hr in a nitrogen atmosphere and maintaining it at that temperature for 1 hour with respect to Samples Nos. 6-9. The bending resistance of each green sheet was evaluated by bending the test piece along a round edge of 3 mm in diameter of a plate and visually observing the bent portion for the occurrence of cracks.

As is apparent from the results shown in Table 6, the green sheets of Samples Nos. 1-9 which were made from an aluminum nitride starting powder prepared by the direct nitriding method and having a size distribution which comprised 22-45% by volume of particles having a diameter equal to or larger than 3 μm and 55 to 78% by volume of particles having a diameter of smaller then 3 μm showed a green density in the range of 2.08-2.20 g/cm³ after drying, and no or slight cracks were observed in these sheets. After the binder removal, these sheets maintained the high quality since no cracks were observed in the visual inspection of the appearance before and after bending. The green densities of the sheets after the binder removal were in the range of 1.78-1.87 g/cm³, which was suitable for minimizing the formation of cracks in the green sheet. The preferable ranges of green density of a green sheet after drying and after binder removal, however, will vary to some extent depending on the type of binders and other factors. Therefore, the above ranges are not always fixed but will be somewhat extended or shifted in some cases.

On the other hand, the green sheets of Samples Nos. 10-13 which were made from a starting powder prepared by the alumina reduction method and containing more than 78% by volume of fine particles having a diameter of less than 3 μm had a green density of the dried sheet before the binder removal in the range of 2.29-2.34 g/cm³. Due to the excessively close packing of the particles in these sheets, cracks were readily formed in these dried green sheets. Similarly, after the binder removal, these sheets showed an increased tendency toward cracking and the green densities of the sheets after the binder removal were in the higher range of 1.97-2.01 g/cm³.

Although the present invention has been described with respect to preferred embodiments, it is to be noted that variations and modifications may be employed without departing from the concept of the invention as defined in the following claims.

What is claimed is:

1. An aluminum nitride sintered body produced by baking an aluminum nitride starting powder with a sintering additive selected from compounds of Group IIa, IIIa, and IIIb metals of the periodic table, said aluminum nitride starting powder being derived by direct nitriding of metallic aluminum and having an oxygen content of not greater than 1.8% by weight and a Si content of not greater than 0.2% by weight, and said aluminum nitride sintered body having a thermal conductivity of at least 100 W/mK and a relative density of at least 95%.

2. An aluminum nitride sintered body according to claim 1, wherein the thermal conductivity is at least 120 W/mK.

3. An aluminum nitride sintered body according to claim 1, wherein the sintering additive comprises predominantly $Y_2O_3$ or a precursor thereof whereby the sintered body consists of AlN grain phases and yttrium-containing grain boundary phases in which yttrium comprises a major proportion of the metallic elements present in the grain boundary phases.

4. An aluminum nitride sintered body according to claim 3, wherein the plot of the $Y_2O_3$-converted yttrium content in weight percent of the sintered body versus the residual oxygen content in weight percent thereof calculated by subtracting the amount of oxygen contained in the $Y_2O_3$-converted yttrium content from the total oxygen content of the sintered body is located within the region defined by lines Q-R-S-T-Q in FIG. 1 (excluding the cases where the plot is on one of the lines), said sintered body having a thermal conductivity of at least 100 W/mK.

5. An aluminum nitride sintered body according to claim 3, wherein the plot of the $Y_2O_3$-converted yttrium content in weight percent of the sintered body versus the residual oxygen content in weight percent thereof calculated by subtracting the amount of oxygen contained in the $Y_2O_3$-converted yttrium content from the total oxygen content of the sintered body is located within the region defined by lines A-B-C-D-E-F-G-H-A in FIG. 1 (including the cases where the plot is on one of the lines but excluding the case where the plot is on point C), said sintered body having a thermal conductivity of at least 120 W/mK.

6. An aluminum nitride sintered body according to claim 3, wherein the plot of the $Y_2O_3$-converted yttrium content in weight percent of the sintered body versus the residual oxygen content in weight percent thereof calculated by subtracting the amount of oxygen contained in the $Y_2O_3$-converted yttrium content from the total oxygen content of the sintered body is located within the region defined by lines I-J-K-N-I in FIG. 1 (including the cases where the plot is on one of the lines), said sintered body having a thermal conductivity of at least 140 W/mK.

7. An aluminum nitride sintered body according to claim 3, wherein the plot of the $Y_2O_3$-converted yttrium content in weight percent of the sintered body versus the residual oxygen content in weight percent thereof calculated by subtracting the amount of oxygen contained in the $Y_2O_3$-converted yttrium content from the total oxygen content of the sintered body is located within the region defined by lines O-P-L-M-O in FIG. 1 (including the cases where the plot is on one of the lines), said sintered body having a thermal conductivity of at least 160 W/mK.

8. An aluminum nitride sintered body according to claim 3, wherein the weight ratio of the $Al_2O_3$-converted residual oxygen content expressed in weight percent as $Al_2O_3$ to the $Y_2O_3$-converted yttrium content $[Al_2O_3/Y_2O_3]$ in the sintered body, and the values of the $Al_2O_3$-converted residual oxygen content $[Al_2O_3]$ and the $Y_2O_3$-converted yttrium content $[Y_2O_3]$ therein meet the following requirements:

$0.2 \leq [Al_2O_3/Y_2O_3] \leq 2.4$, $1.1 \leq [Al_2O_3] \leq 12.0$ (in weight percent), and $2.0 < [Y_2O_3] < 12.0$ (in weight percent), said sintered body having a thermal conductivity of at least 100 W/mK and a three-point bending strength of at least 30 kg/mm².

9. An aluminum nitride sintered body according to claim 8, wherein the weight ratio $[Al_2O_3/Y_2O_3]$ and the values of $[Al_2O_3]$ and $[Y_2O_3]$ meet the following requirements:

$0.2 \leq [Al_2O_3/Y_2O_3] \leq 1.7$, $1.1 \leq [Al_2O_3] \leq 11.0$ (in weight percent), and $3.9 \leq [Y_2O_3] \leq 9.0$ (in weight percent), said sintered body having a thermal conductivity of at least 120 W/mK and a three-point bending strength of at least 35 kg/mm².

10. An aluminum nitride sintered body according to claim 8, wherein the weight ratio $[Al_2O_3/Y_2O_3]$ and the values of $[Al_2O_3]$ and $/Y_2O_3]$ meet the following requirements:

$0.6 \leq [Al_2O_3/Y_2O_3] \leq 1.4$, $3.2 \leq [Al_2O_3] \leq 7.0$ (in weight percent), and $3.9 \leq [Y_2O_3] \leq 7.0$ (in weight percent), said sintered body having a thermal conductivity of at least 140 W/mK and a three-point bending strength of at least 40 kg/mm².

11. An aluminum nitride sintered body according to claim 8, wherein the weight ratio $[Al_2O_3/Y_2O_3]$ and the values of $[Al_2O_3]$ and $[Y_2O_3]$ meet the following requirements:

$0.6 \leq [Al_2O_3/Y_2O_3] \leq 1.2$, $3.2 \leq [Al_2O_3] \leq 6.0$ (in weight percent), and $4.5 \leq [Y_2O_3] \leq 6.0$ (in weight percent), said sintered body having a thermal conductivity of at least 160 W/mK and a three-point bending strength of at least 40 kg/mm².

12. An aluminum nitride sintered body according to claim 3, wherein the weight ratio of the Si content to the Y content [Si/Y] in the sintered body and the Si content [Si] and the Y content [Y] therein meet the following requirements:

$[Si/Y] \leq 1.32$, $[Si] \leq 1.3$ (in weight percent), and $1.6 < [Y] < 9.4$ (in weight percent), said sintered body having a thermal conductivity of at least 100 W/mK.

13. An aluminum nitride sintered body according to claim 12, wherein the weight ratio [Si/Y] in the sintered body and the values of [Si] and [Y] meet the following requirements:

$[Si/Y] \leq 0.21$, $[Si] \leq 0.9 \leq$ (in weight percent), and $3.1 \leq [Y] \leq 7.1$ (in weight percent), said sintered body having a thermal conductivity of at least 120 W/mK.

14. An aluminum nitride sintered body according to claim 12, wherein the weight ratio [Si/Y] in the sintered body and the values of [Si] and [Y] meet the following requirements:

$[Si/Y] \leq 0.12$, $[Si] \leq 0.5$ (in weight percent), and $3.1 \leq [Y]5.5$ (in weight percent), said sintered body having a thermal conductivity of at least 140 W/mK.

15. An aluminum nitride sintered body according to claim 12, wherein the weight ratio [Si/Y] in the sintered body and the values of [Si] and [Y] meet the following requirements:

$[Si/Y] \leq 0.05$, $[Si] \leq 0.2$ (in weight percent), and $3.5 \leq [Y] \leq 4.7$ (in weight percent), said sintered body having a thermal conductivity of at least 160 W/mK.

16. An aluminum nitride sintered body according to claim 3, wherein the metallic composition of the grain boundary phases in the sintered body comprises 60%-91% by weight of Y, 8%-35% by weight of Al, and not greater than 10% by weight of Si based on the total metallic content in the grain boundary phases, said sintered body having a thermal conductivity of at least 140 W/mK.

17. An aluminum nitride sintered body according to claim 3, wherein the metallic composition of the grain boundary phases in the sintered body comprises 70%-91% by weight of Y, 8%-25% by weight of Al, and not greater than 3% by weight of Si based on the total metallic content in the grain boundary phases, said sintered body having a thermal conductivity of at least 160 W/mK.

18. An aluminum nitride sintered body according to claim 5, wherein the weight ratio of the $Al_2O_3$-converted residual oxygen content that is the residual oxygen content expressed in weight percent as $Al_2O_3$ to the $Y_2O_3$-converted yttrium content $[Al_2O_3/Y_2O_3]$ in the sintered body, and the $Al_2O_3$-converted residual oxygen content $[Al_2O_3]$ meet the following requirements:

$$0.2 \leq [Al_2O_3/Y_2O_3] \leq 1.7, \text{ and}$$

$$1.1 \leq [Al_2O_3] \leq 11.0 \text{ (in weight percent),}$$

and wherein the weight ratio of the Si content to the Y content [Si/Y] in the sintered body and the Si content [Si] therein meet the following requirements:

$$[Si/Y] \leq 0.21, \text{ and}$$

$$[Si] \leq 0.9 \text{ (in weight percent),}$$

said sintered body having a thermal conductivity of at least 120 W/mK and a three-point bending strength of at least 35 kg/mm$^2$.

19. A process for producing an aluminum nitride sintered body having a thermal conductivity of at least 100 W/mK and a relative density of at least 95%, comprising mixing a minor amount of a sintering additive selected from compounds of Group IIa, IIIa, and IIIb metals of the periodic table with an aluminum nitride starting powder prepared by direct nitriding of metallic aluminum and having a purity of at least 99%, an oxygen content of lower than 1.8% by weight and an Si content of not greater than 0.2% by weight to form a powder mixture, shaping the powder mixture, and baking the shaped mixture at a temperature in the range of 1500°-2100° C. in a non-oxidizing atmosphere for a time sufficient to sinter the mixture.

20. A process according to claim 19, wherein any pulverization of the starting powder or the powder mixture or both is conducted in a non-oxidizing atmosphere or in an organic solvent.

21. A process according to claim 19, wherein the powder mixture has an average particle diameter of not greater than 2.5 μm and an oxygen content of not greater than about 6% by weight.

22. A process according to claim 19, wherein the sintering additive comprises predominantly $Y_2O_3$ or a precursor thereof and is used in such an amount that the powder mixture contains yttrium in an amount of from about 2% to about 12% by weight calculated as $Y_2O_3$ based on the total weight of the powder mixture.

23. A process according to claim 22, wherein the residual oxygen content calculated by subtracting the amount of oxygen which will combine with the yttrium content in the powder mixture in the form of $Y_2O_3$ from the total oxygen content of the powder mixture is in the range of from 0.38% to 6.69% by weight.

24. A process according to claim 22, wherein the residual oxygen content calculated by subtracting the amount of oxygen which will combine with the yttrium content in the powder mixture in the form of $Y_2O_3$ from the total oxygen content of the powder mixture is in the range of from 0.38% to 4.92% by weight, and wherein the sintered body has a thermal conductivity of at least 120 W/mK.

25. A process according to claim 22, wherein the residual oxygen content calculated by subtracting the amount of oxygen which will combine with the yttrium content in the powder mixture in the form of $Y_2O_3$ from the total oxygen content of the powder mixture is in the range of from 1.28% to 3.67% by weight, and wherein the sintered body has a thermal conductivity of at least 140 W/mK.

26. A process according to claim 22, wherein the residual oxygen content calculated by subtracting the amount of oxygen which will combine with the yttrium content in the powder mixture in the form of $Y_2O_3$ from the total oxygen content of the powder mixture is in the range of from 1.41% to 3.15% by weight, and wherein the sintered body has a thermal conductivity of at least 160 W/mK.

27. A process according to claim 22, wherein the powder mixture contains yttrium in an amount of not greater than 3% by weight calculated as $Y_2O_3$ and further contains $Al_2O_3$ which is added in such an amount that the powder mixture contains not greater than 2% by weight of $Al_2O_3$, said aluminum nitride sintered body having improved bending strength.

28. A process according to claim 27, wherein the powder mixture contains yttrium in an amount of greater than 3% and not greater than 9% by weight calculated as $Y_2O_3$ and further contains $Al_2O_3$ which is added in such an amount that the powder mixture contains not greater than 5% by weight of $Al_2O_3$, said aluminum nitride sintered body having improved bending strength.

29. A process according to claim 27, wherein the powder mixture contains yttrium in an amount of greater than 9% and lower than 12% by weight calculated as $Y_2O_3$ and further contains $Al_2O_3$ which is added in such an amount that the powder mixture contains not greater than 7% by weight of $Al_2O_3$, said aluminum nitride sintered body having improved bending strength.

30. A process according to claim 19, wherein at least one binder selected from butyral polymers and acrylate polymers, an organic solvent, and optionally a plasticizer are added to the powder mixture to form a slurry comprising the powder mixture, the slurry is shaped into a sheet, and subsequent to drying and binder removal, the resulting green sheet is baked at a temperature of 1750°-1950° C. in a non-oxidizing atmosphere by a technique selected from pressureless sintering, gas-pressure sintering, hot isostatic pressing, and combinations thereof.

31. A process according to claim 30, wherein the aluminum nitride starting powder has a particle size distribution in which from 22% to 45% by volume of the powder is made up of particles having a diameter equal to or larger than 3 μm and from 55% to 78% by volume of the powder is made up of particles having a diameter smaller than 3 μm.

32. A process according to claim 19, wherein the baking of the shaped powder mixture is conducted by means of pressureless sintering at a temperature of 1750°-1950° C.

33. A process according to claim 19, wherein the baking of the shaped powder mixture is conducted by means of hot pressing at a temperature of 1600°-1800° C.

34. A process according to claim 19, wherein the baking of the shaped powder mixture is conducted by means of gas-pressure sintering at a temperature of 1880°-1970° C.

35. A process according to claim 19, wherein the baking of the shaped powder mixture is conducted by means of hot isostatic pressing at a temperature of 1500°-2000° c.

36. A method of making an aluminum nitride-based green sheet having improved green strength, which comprises mixing an aluminum nitride starting powder derived by direct nitriding of metallic aluminum and having a purity of at least 99%, an oxygen content of lower than 1.8% by weight and an Si content of not greater than 0.7% by weight with a sintering additive selected from compounds of Group IIa, IIIa, and IIIb metals of the periodic table, an organic polymeric binder, and optionally a plasticizer in an organic solvent to form a slurry, and shaping the slurry into a sheet followed by drying of the sheet, wherein the aluminum nitride starting powder has a particle size distribution in which from 22% to 45% by volume of the powder is made up of particles having a diameter equal to or larger than 3 $\mu$m and from 55% to 78% by volume of the powder is made up of particles having a diameter smaller than 3 $\mu$m.

37. A method according to claim 36, wherein the sintering additive comprises predominantly $Y_2O_3$ or a precursor thereof and is used in such an amount that yttrium is present in a concentration of from about 2% to about 12% by weight calculated as $Y_2O_3$ based on the total weight of the starting powder and the sintering additive.

38. A method according to claim 36, wherein the organic polymeric binder is a butyral or acrylate polymer.

39. A method according to claim 38, wherein the organic polymeric binder is polyvinylbutyral.

40. A method according to claim 38, wherein the organic polymeric binder is a copolymer comprising methyl methacrylate and ethyl acrylate.

41. A green sheet produced by a method according to claim 36.

42. A green sheet produced by a method according to claim 37.

43. An aluminum nitride sintered body according to claim 1, wherein the thermal conductivity is at least 140 W/mK.

44. An aluminum nitride sintered body according to claim 1, wherein the thermal conductivity is at least 160 W/mK.

45. A process according to claim 19, wherein said powder mixture consists essentially of said sintering additive and said aluminum nitride starting powder.

46. A process according to claim 19, wherein said powder mixture consists of said sintering additive and said aluminum nitride starting powder.

47. An aluminum nitride sintered body produced by baking an aluminum nitride starting powder having an average particle size of not more than 5 $\mu$m with a sintering additive selected from compounds of Group IIa, IIIa, and IIIb metals of the periodic table, said aluminum nitride starting powder being derived by direct nitriding of metallic aluminum and having an oxygen content of not greater than 1.8% by weight and an Si content of not greater than 0.2% by weight.

48. An aluminum nitride sintered body produced by baking an aluminum nitride starting power having an average particle size within a range of 1 to 3 $\mu$m with a sintering additive selected from compounds of Group IIa, IIIa, and IIIb metals of the periodic table, said aluminum nitride starting powder being derived by direct nitriding of metallic aluminum and having an oxygen content of not greater than 1.8% by weight and an Si content of not greater than 0.2% by weight.

* * * * *